(12) United States Patent
Sung et al.

(10) Patent No.: US 8,396,070 B2
(45) Date of Patent: *Mar. 12, 2013

(54) METHOD FOR TRANSMITTING VOIP PACKET

(75) Inventors: Doo Hyun Sung, Anyang-si (KR);
Hyung Ho Park, Anyang-si (KR); Jae Hoon Chung, Anyang-si (KR); Kyu Jin Park, Anyang-si (KR); Eun Jong Lee, Anyang-si (KR); Han Gyu Cho, Anyang-si (KR); Jin Soo Choi, Anyang-si (KR); Jong Young Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 260 days.

This patent is subject to a terminal disclaimer.

(21) Appl. No.: 12/705,215

(22) Filed: Feb. 12, 2010

(65) Prior Publication Data

US 2010/0238875 A1     Sep. 23, 2010

Related U.S. Application Data

(63) Continuation of application No. 12/673,262, filed as application No. PCT/KR2008/004699 on Aug. 13, 2008.

(60) Provisional application No. 60/955,401, filed on Aug. 13, 2007, provisional application No. 61/023,432, (Continued)

(30) Foreign Application Priority Data

Nov. 16, 2007 (KR) .......................... 10-2007-0117514
Jan. 10, 2008 (KR) .......................... 10-2008-0003031

(51) Int. Cl.
*H04J 3/16* (2006.01)
(52) U.S. Cl. ....................................................... 370/437
(58) Field of Classification Search .......... 370/310–349, 370/431–444, 229–230, 464
See application file for complete search history.

(56) References Cited

U.S. PATENT DOCUMENTS 6,963,544 B1   11/2005   Balachandran et al.

(Continued)

FOREIGN PATENT DOCUMENTS

CN     101690370 A     3/2010
EP      1986459 A1    10/2008

(Continued)

OTHER PUBLICATIONS

Haiming Wang, Esa Malkamaki, Dajie Jiang, "Method and Apparatus for Acknowledgement Signaling", U.S. Appl. No. 60/889,148.*

(Continued)

*Primary Examiner* — Jeffrey M Rutkowski
*Assistant Examiner* — Juvena Loo
(74) *Attorney, Agent, or Firm* — McKenna Long & Aldridge LLP

(57) ABSTRACT

A method for transmitting a voice over Internet protocol (VoIP) packet includes allocating a radio resource for VoIP packet transmission to a user, transitioning a VoIP service from a talk period, in which the VoIP packet is transmitted using the radio resource, to a silence period in which the VoIP packet is not transmitted, releasing the radio resource during the silence period, and transitioning the VoIP service to the talk period by reallocating the radio resource. Limited radio resources can be further effectively used.

8 Claims, 36 Drawing Sheets

Related U.S. Application Data filed on Jan. 25, 2008, provisional application No. 61/031,702, filed on Feb. 27, 2008, provisional application No. 61/038,412, filed on Mar. 21, 2008, provisional application No. 61/039,090, filed on Mar. 24, 2008, provisional application No. 61/055,445, filed on May 22, 2008.

(56) References Cited

U.S. PATENT DOCUMENTS

| | | | |
|---|---|---|---|
| 6,963,545 | B1 | 11/2005 | Ho |
| 7,512,099 | B2 | 3/2009 | Ameigeiras et al. |
| 8,005,071 | B2 | 8/2011 | Kim |
| 2003/0147371 | A1* | 8/2003 | Choi et al. ............ 370/341 |
| 2005/0096051 | A1 | 5/2005 | Lee et al. |
| 2005/0117539 | A1 | 6/2005 | Song et al. |
| 2006/0245352 | A1 | 11/2006 | Kang et al. |
| 2007/0047493 | A1 | 3/2007 | Park et al. |
| 2007/0133449 | A1* | 6/2007 | Schacht et al. ......... 370/312 |
| 2007/0183361 | A1 | 8/2007 | DamnJanovic et al. |
| 2008/0101281 | A1* | 5/2008 | Harris et al. ........... 370/328 |
| 2008/0101286 | A1 | 5/2008 | Wang et al. |
| 2008/0117891 | A1* | 5/2008 | Damnjanovic et al. ....... 370/345 |
| 2008/0123673 | A1 | 5/2008 | Lee |
| 2008/0159323 | A1* | 7/2008 | Rinne et al. ........... 370/431 |
| 2008/0192674 | A1* | 8/2008 | Wang et al. ........... 370/315 |
| 2008/0259862 | A1* | 10/2008 | Yeo et al. .............. 370/329 |
| 2008/0267118 | A1 | 10/2008 | Cai et al. |
| 2008/0310395 | A1 | 12/2008 | Kashima |
| 2008/0311919 | A1 | 12/2008 | Whinnett et al. |
| 2009/0219914 | A1* | 9/2009 | Harada et al. .......... 370/345 |
| 2010/0183031 | A1* | 7/2010 | Dalsgaard et al. ........... 370/474 |

FOREIGN PATENT DOCUMENTS

| | | |
|---|---|---|
| JP | 2005-252627 A | 9/2005 |
| JP | 2006-274812 A | 10/2006 |
| JP | 2006-287522 A | 10/2006 |
| WO | WO 2005/125252 A1 | 12/2005 |
| WO | WO 2006/037492 A1 | 4/2006 |
| WO | WO 2007/052922 | 5/2007 |

OTHER PUBLICATIONS

Lars Dalsgaard, Seppo Alanara, Jarkko T. Koskela, "Apparatus, Method and Computer Program Product Providing Distribution of Segmented System Information or Scheduling Units"; U.S. Appl. No. 60/937,338.*

R2-071368 (Alcatel-Lucent), "Persistent DL Scheduling and VoIP", 3GPP TSG-RAN WG2 #57bis, Malta, Mar. 26-30, 2007.

R1-071721 XP-002460800 (Alcatel-Lucent), "DL Control Signaling and Multiplexing for VoIP", 3GPP TSG-RAN WG1 Meeting #48 bis, St. Julians, Malta, Mar. 26-30, 2007.

R2-063183 (InterDigital Communications Corporation), "Periodic Scheduling of Uplink Resources for LTe VoIP", 3GPP TSG-RAN WG2 #56, Riga, Latvia, Nov. 6-10, 2006.

R2-071944 (LG Electronics Inc.), "Transition Indicator for VoIP in UL", 3GPP TSG-RAN WG2 #58, Kobe, Japan, Mar. 7-11, 2007.

R2-062164 (NTT DoCoMo, Inc.), "Uplink Resource Allocation Scheme", 3GPP TSG RAN WG2 #54, Tallinn, Estonia, Aug. 28-Sep. 1, 2006.

R2-070476(Nokia), "Uplink Scheduling for VoIP," 3GPP TSG-RAN WG2 Meeting #57, St Louis, Missouri, USA, Feb. 12-16, 2007.

R2-062164(NTT DoCoMo, Inc.), "Uplink Resource Allocation Scheme," 3GPP TSG-RAN WG2 Meeting #54, Tallinn, Estonia, Aug. 28-Sep. 1, 2006.

Alcatel-Lucent, DL Control Signaling and Multiplexing for VoIP, 3GPP TSG RAN WG1 Meeting #48bis, Mar. 26, 2007, R1-071721.

Alcatel-Lucent, Persistent DL Scheduling and VoIP, 3GPP TSG RAN WG2 #57bis, Mar. 26, 2007, R2-071368.

InterDigital Communications Corporation, Periodic Scheduling of Uplink Resources for LTE VoIP, 3GPP TSG RAN WG2 #56, Nov. 6, 2006, R2-063183.

LG Electronics Inc., Transition indicator for VoIP in UL, 3GPP TSG RAN WG2 #57bis, Mar. 26, 2007, R2-071449.

* cited by examiner

▨ : Time/frequency resource allocation for VoIP UE

▯ : Time/frequency resource release for VoIP UE

▤ : Silence descriptor/Silence insertion descriptor (SID)

▧ : MAC or RLC level message for silence indication

FIG. 12
Silent to talk period transition
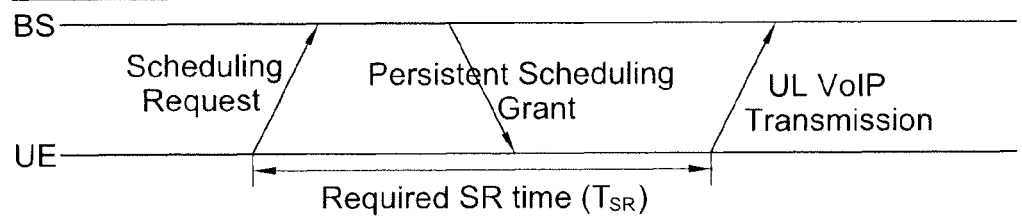
RTCP transmission
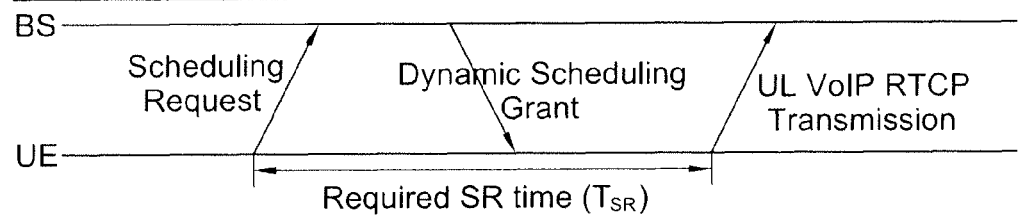

: retransmission timing of 1st VoIP packet if the feedback for the 1st VoIP packet is a NACK signal

METHOD FOR TRANSMITTING VOIP PACKET

This application is a continuation application of U.S. patent application Ser. No. 12/673,262, filed on Feb. 12, 2010, which is a national phase application based on International Application No. PCT/KR2008/004699, filed on Aug. 13, 2008, which claims priority to U.S. Provisional Application No. 60,955,401, filed on Aug. 13, 2007, Korean Patent Application No. 10-2007-0117514, filed on Nov. 16, 2007, Korean Patent Application No. 10-2008-0003031, filed on Jan. 10, 2008, U.S. Provisional Application No. 61/023,432, filed on Jan. 25, 2008, U.S. Provisional Application No. 61/031,702, filed on Feb. 27, 2008, U.S. Provisional Application No. 61/038,412, filed on Mar. 21, 2008, U.S. Provisional Application No. 61/039,090, filed on Mar. 24, 2008 and 61/055,445, filed on May 22, 2008, all of which are incorporated by reference for all purposes as if fully set forth herein.

TECHNICAL FIELD

The present invention relates to wireless communications, and more particularly, to a method for transmitting a voice over Internet protocol (VoIP) packet for a VoIP service.

BACKGROUND ART

Next generation mobile communication systems have been standardized aiming at providing integrated services and effective interoperations between a wired communication network and a wireless communication network, beyond a simple wireless communication service provided in the conventional mobile communication systems. With the demand on a high-speed, large-volume data communication system for processing and transmitting a variety of information such as radio data as well as providing voice-oriented services, there is a need for developing a technique for transmitting large-volume data through the wireless communication network whose capacity is similar to that of the wired communication network.

An orthogonal frequency division multiplexing (OFDM) system capable of reducing inter-symbol interference with a low complexity is taken into consideration as one of next generation (after a 3rd generation) systems. In the OFDM system, serial input data symbols are converted into N parallel data symbols and are carried and transmitted on separate N subcarriers. The subcarriers maintain orthogonality in a frequency dimension. Orthogonal channels experience mutually independent frequency selective fading. Inter-symbol interference can be minimized since intervals of transmitted symbols are lengthened. Orthogonal frequency division multiple access (OFDMA) is a multiple access scheme in which multiple access is achieved by independently providing some of available subcarriers to a plurality of users when using a system which employs the OFDM as a modulation scheme. In the OFDMA, frequency resources (i.e., subcarriers) are provided to the respective users, and the respective subcarriers are independently provided to the plurality of users. Thus, the subcarriers generally do not overlap with one another. Eventually, the frequency resources are mutually exclusively allocated to the respective users.

For the effective use of limited radio resources, a base station (BS) schedules the radio resources. When there is no data packet transmitted using radio resources allocated to a user, the BS performs scheduling such that unused radio resources can be used by another user. Thus, the radio resources can be further effectively used. As such, radio resources may not be allocated to a user who does not have a data packet to be transmitted/received. Instead, the radio resources may be allocated to a user who has a data packet to be transmitted/received. In this manner, the radio resources can be dynamically allocated on a frequency domain or a time domain. Such a scheme is referred to as dynamic scheduling.

In a voice over Internet Protocol (VoIP) service, a VoIP packet may not be transmitted. Even in this case, the resources are persistently allocated until a VoIP session is closed. That is, once allocated, the radio resources are maintained for a predetermined time period. Such scheduling is referred to as persistent scheduling, which leads to efficiency deterioration under the limited radio resources.

Accordingly, there is a need for a method for effectively managing limited radio resources in a VoIP service.

DISCLOSURE OF INVENTION

Technical Problem

The present invention provides a method for transmitting a voice over Internet protocol (VoIP) packet so that limited radio resources can be effectively used in a VoIP service.

Technical Solution

According to an aspect of the present invention, a method for transmitting a Voice over Internet protocol (VoIP) packet is provided. The method includes: allocating a radio resource for VoIP packet transmission to a user; transitioning a VoIP service from a talk period, in which the VoIP packet is transmitted using the radio resource, to a silence period in which the VoIP packet is not transmitted; releasing the radio resource during the silence period; and transitioning the VoIP service to the talk period by reallocating the radio resource.

According to another aspect of the present invention, a method for transmitting a VoIP packet by using a radio resource allocated for a VoIP service is provided. The method includes: transmitting the VoIP packet during a talk period in which the VoIP packet is transmitted using the radio resource; and transmitting a silence descriptor during the talk period, the silence descriptor being used to instruct transition to a silence period in which the VoIP packet is not transmitted, wherein the radio resource is released during the talk period.

According to yet another aspect of the present invention, a method for transmitting a VoIP packet is provided. The method includes: transmitting to a base station a dedicated scheduling request message during a silence period in which the VoIP packet is not transmitted, the dedicated scheduling request message requesting allocation of a radio resource required for data transmission; receiving from the base station scheduling information selected from persistent scheduling information and dynamic scheduling information, the persistent scheduling information being used to persistently allocate the radio resource with a specific time interval, the dynamic scheduling information being used to sequentially allocate the radio resource; and transmitting to the base station an information packet by using the radio resource.

According to yet another aspect of the present invention, a method for transmitting a VoIP packet is provided. The method includes: receiving persistent scheduling information which is used to persistently allocate the radio resource with a specific time interval; transmitting uplink data by using the radio resource; starting a timer, the timer indicating a time point at which the uplink data is flushed from a buffer; and if new persistent scheduling information is not transmitted until the timer expires, flushing the uplink data from the buffer and transmitting new uplink data by using the radio resource. The uplink data may be the VoIP packet. Alternatively, the uplink data may be non-voice data. The method may further include, if the new persistent scheduling information is received before the timer expires, retransmitting the uplink data according to the new persistent scheduling information.

According to yet another aspect of the present invention, a method for providing a VoIP service is provided. The method includes: transmitting 1st configuration information including preparation information required to prepare the VoIP service based on persistent scheduling; transmitting 2nd configuration information initiating activation of the VoIP service; and activating the VoIP service by using the 1st and 2nd configuration information. The 1st configuration information may include a persistent scheduling interval indicating a time interval with which a radio resource used for VoIP packet transmission is allocated. The 2nd configuration information may include resource allocation information and an activation start time at which the VoIP packet is transmitted/received through the persistent scheduling. The activating of the VoIP service may further include, from the activation start time, transmitting the VoIP packet according to the resource allocation information with the persistent scheduling interval.

According to yet another aspect of the present invention, a method for transmitting a VoIP packet by using a hybrid automatic repeat request (HARQ) is provided. The method includes: transmitting a 1st VoIP packet at a 1st transmission time according to persistent scheduling; and transmitting a 2nd VoIP packet at a 2nd transmission time according to the persistent scheduling irrespective of whether an acknowledgement/not-acknowledgment (ACK/NACK) signal for the 1st VoIP packet is received or not. The method may further include, if the NACK signal is received for the 1st VoIP packet before the 2nd transmission time, retransmitting the 1st VoIP packet by using a HARQ process for managing retransmission of the 1st VoIP packet. A plurality of HARQ processes may be provided.

According to yet another aspect of the present invention, a method for providing a VoIP service is provided. The method includes: transmitting a silence insertion descriptor (SID) using either persistently allocated resource or dynamically allocated resource, the SID indicating transition from talk period to silence period, the persistently allocated resource being for a VoIP packet transmission, the dynamically allocated resource being for non-voice data; and receiving a resource release indicator which indicates that the persistently allocated resource during the talk period is released. The SID is selected one of a MAC and RLC and RRC message. If SID is transmitted using the dynamically allocated resource, the SID is multiplex with the non-voice data.

According to yet another aspect of the present invention, a method for providing a VoIP service is provided. The method includes: transmitting a talk period indicator (TPI) using dynamically allocated resource, the TPI indicating transition from silence period to talk period, the dynamically allocated resource being for non-voice data; transmitting a VoIP reactivation message which indicates that the talk period restarts; and transmitting a VoIP packet in the talk period. The VoIP packet can be a downlink VoIP packet or an uplink VoIP packet Advantageous Effects According to the present invention, information on a silence period and a talk period is exchanged between a user equipment and a base station in a voice over Internet protocol (VoIP) service. Therefore, different type of data can be transmitted during the silence period by dynamically using persistently allocated Persistent resources. As a result, limited radio resources can be further effectively used.

BRIEF DESCRIPTION OF THE DRAWINGS

FIG. 12 shows a method for transitioning from a silence period to a talk period according to another embodiment of the present invention.

MODE FOR THE INVENTION

Figure 1:
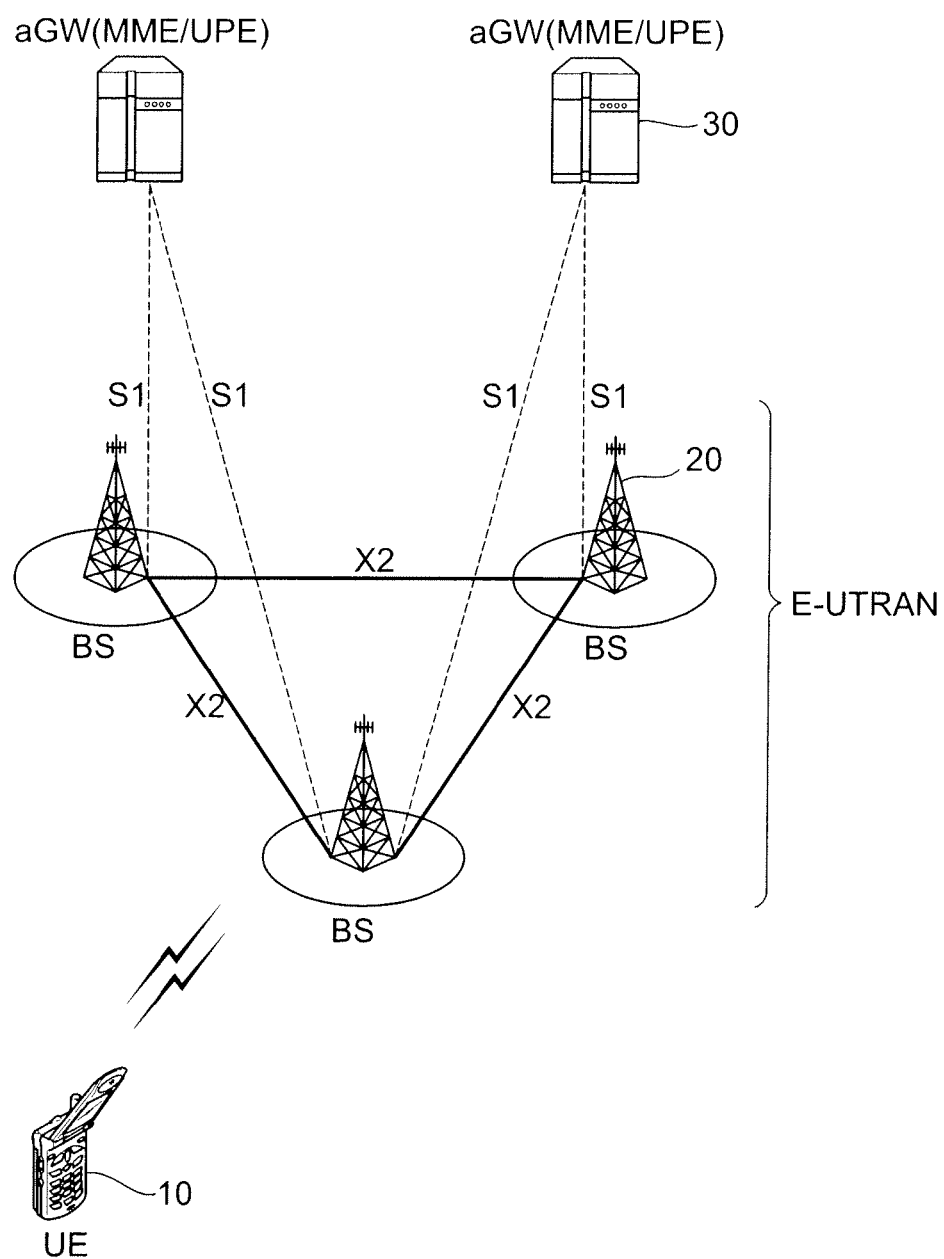
FIG. 1 shows a wireless communication system.

FIG. 1 shows a wireless communication system. The wireless communication system may have a network structure of an evolved-universal mobile telecommunications system (E-UMTS). The E-UMTS may be referred to as a long-term evolution (LTE) system. The wireless communication system can be widely deployed to provide a variety of communication services, such as voices, packet data, etc.

Referring to FIG. 1, an evolved-UMTS terrestrial radio access network (E-UTRAN) includes at least one base station (BS) 20. A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. Interfaces for transmitting user traffic or control traffic may be used between the BSs 20. Hereinafter, downlink is defined as a communication link from the BS 20 to the UE 10, and uplink is defined as a communication link from the UE 10 to the BS 20.

The BS 20 provides the UE 10 with an end-to-end point of a user plane and a control plane. The BSs 20 are interconnected by means of an X2 interface, and may have a meshed network structure in which the X2 interface always exists between the neighboring BSs 20.

The BSs 20 are also connected by means of an S1 interface to an evolved packet core (EPC), more specifically, to an access gateway (aGW) 30. The aGW 30 provides an end-to-end point for a session and mobility management function of the UE 10. The S1 interface may be provided between the BS 20 and the aGW 30 so that a plurality of nodes can be interconnected in a many-to-many manner. The aGW 30 can be classified into a part for processing user traffic and a part for processing control traffic. In this case, for inter-communication, a new interface may be used between an aGW for processing new user traffic and an aGW for processing new control traffic. The aGW 30 is also referred to as a mobility management entity/user plane entity (MME/UPE).

Layers of a radio interface protocol between the UE and the network can be classified into L1 layer (a first layer), L2 layer (a second layer), and L3 layer (a third layer) based on the lower three layers of the open system interconnection (OSI) model that is well-known in the communication system. A physical (PHY) layer belongs to the first layer and provides an information transfer service on a physical channel. A radio resource control (RRC) layer belongs to the third layer and serves to control radio resources between the UE and the network. The UE and the network exchange RRC messages via the RRC layer. The RRC layer may be located in network nodes (i.e., the BS 20, the aGW 30, etc.) in a distributed manner, or may be located only in the BS 20 or the aGW 30.

The radio interface protocol horizontally includes a PHY layer, a data link layer, and a network layer, and vertically includes a user plane for data information transfer and a control plane for control signaling delivery.

Figure 2:
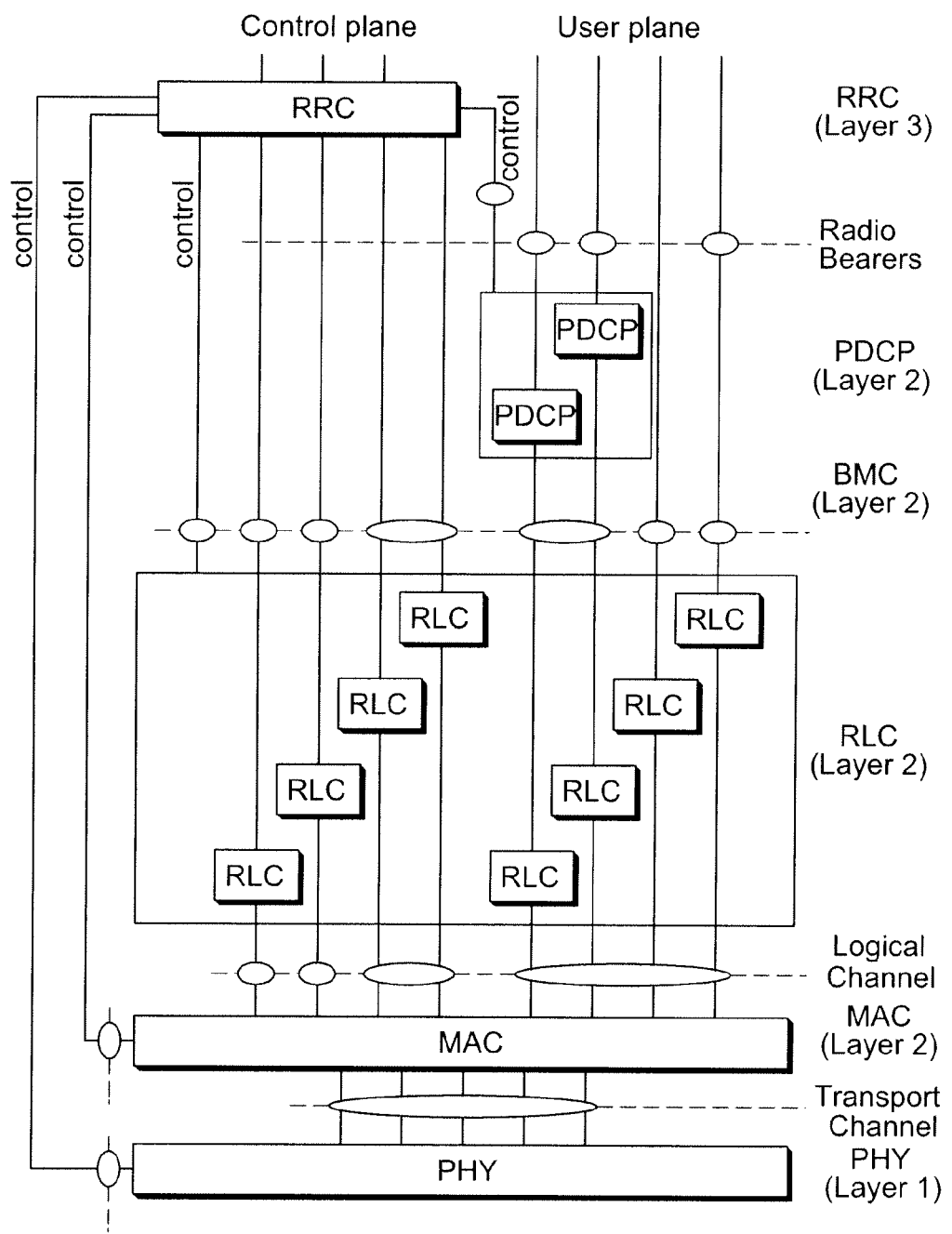
FIG. 2 shows a radio protocol architecture.

FIG. 2 shows a radio protocol architecture. A pair of radio protocol layers exits between the UE and the UTRAN and serves to transmit data of a radio link.

Referring to FIG. 2, a PHY layer belongs to the first layer and transmits data to the radio link by using various radio transmission techniques. The PHY layer is connected through a transport channel to a medium access control (MAC) layer which is an upper layer of the PHY layer. The transport channel can be classified into a dedicated transport channel and a common transport channel according to whether the channel is shared or not.

The second layer includes the MAC layer, a radio link control (RLC) layer, and a packet data convergence protocol (PDCP) layer.

The MAC layer maps various logical channels onto various transport channels. Further, the MAC layer performs logical channel multiplexing so that a plurality of logical channels are mapped onto one transport channel. The MAC layer is connected through a logical channel to the RLC layer which is an upper layer of the MAC layer. According to a type of information transmitted, the logical channel is classified into a control channel and a traffic channel. The control channel transmits information of a control plane. The traffic channel transmits information of a user plane. According to a type of the transport channel managed in detail, the MAC layer is classified into a MAC-b sublayer, a MAC-d sublayer, a MAC-c/sh sublayer, a MAC-hs sublayer, and a MAC-e sublayer. The MAC-b sublayer manages a broadcast channel (BCH) which is a transport channel for broadcasting system information. The MAC-c/sh sublayer manages a common transport channel (e.g., a forward access channel (FACH) or a downlink shared channel (DSCH)) shared by other UEs. The MAC-d sublayer manages a dedicated channel (DCH) which is a dedicated transport channel for a specific UE. In order to support high-speed data transmission in downlink and uplink, the MAC-hs sublayer manages a high speed downlink shared channel (HS-DSCH) which is a transport channel for high-speed downlink (DL) transmission. In addition, the MAC-e sublayer manages an enhanced dedicated channel (E-DCH) which is a transport channel for high-speed uplink (UL) transmission.

The RLC layer guarantees quality of services (QoS) of all radio bearers (RB) so that data can be transmitted with the guaranteed QoS. The RLC layer has one or two independent RLC entities in order to guarantee a unique QoS for each RB. The RLC layer provides three RLC modes so that the QoS can be supported variously. The three RLC modes include a transparent mode (TM), an unacknowledged mode (UM), and an acknowledged mode (AM). Further, the RLC layer regulates a data size sufficient for data transmission when a lower layer of the RLC layer transmits data to the radio link. For this, the RLC layer segments and concatenates the data received from an upper layer of the RLC layer.

The PDCP layer is an upper layer of the RLC layer. In a radio link with a relatively narrow bandwidth, the PDCP layer provides effective transfer of data when the data is transmitted using an Internet protocol (IP) packet such as an IPv4 packet or an IPv6 packet. For this, the PDCP layer performs a header compression function. By performing the header compression function, only necessary information included in a header of the data is transmitted. Therefore, efficiency of the radio link can be increased. Header compression is a primary function of the PDCP layer. Thus, the PDCP layer exists only in a packet service (PS) domain. In order to effectively provide the header compression function to all PS services, one PDCP entity exists for one RB.

The third layer includes a radio resource control (RRC) layer as a lowest layer. The RRC layer is defined only in the control plane. The RRC layer controls parameters of the first layer and the second layer in association with configuration, reconfiguration and release of radio bearers (RB), and also controls the logical channel, the transport channel, and the physical channel. The RB denotes a logical path provided by the first layer and the second layer of the radio protocol for data transfer between the UE and the UTRAN. In general, the configuration of the RB denotes a process which specifies a channel property and a radio protocol layer required to provide a specific service and which determines a method for operating definite parameters.

Now, a method for providing a VoIP packet service will be described.

(1) A Method for Managing Radio Resources in a VoIP Packet Service

Figure 3:
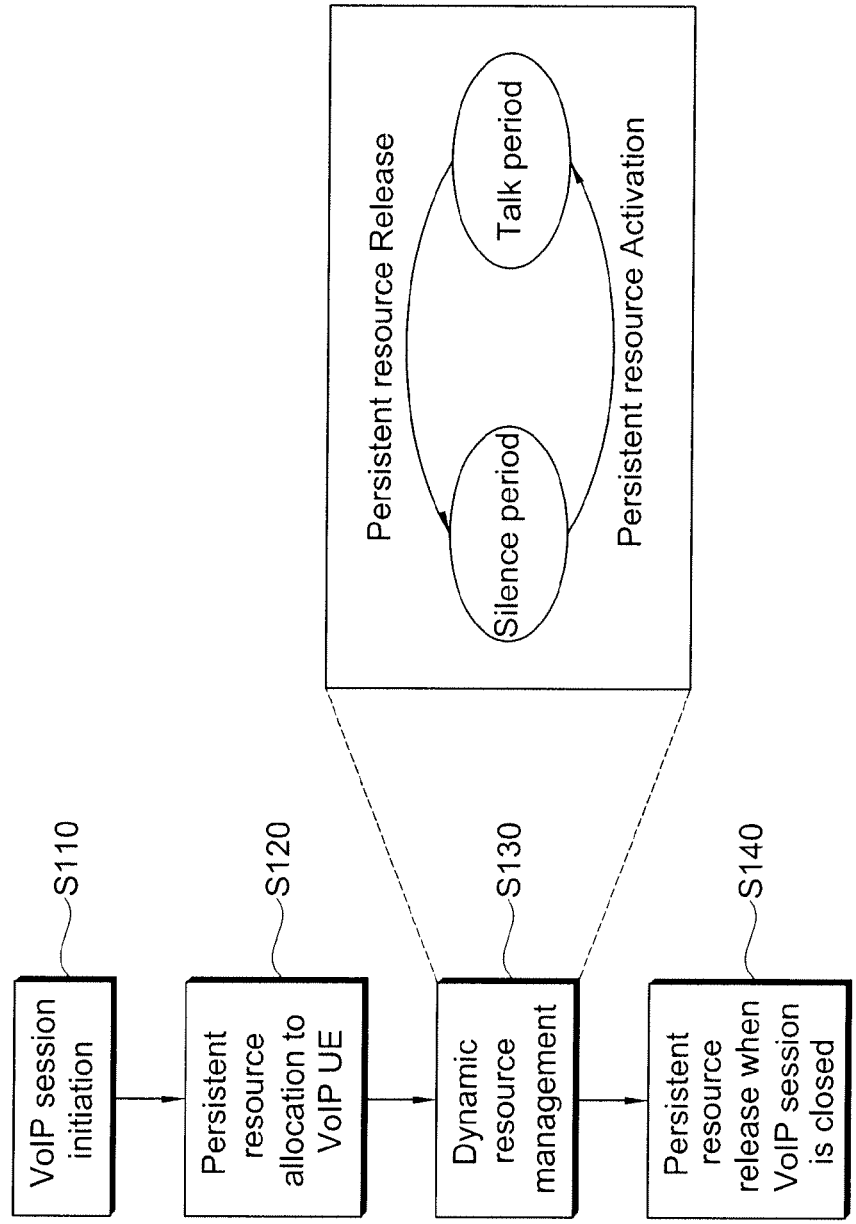
FIG. 3 shows a method for managing radio resources according to an embodiment of the present invention.

FIG. 3 shows a method for managing radio resources according to an embodiment of the present invention.

Referring to FIG. 3, when a UE requests a BS to provide a VoIP service, or when the BS requests the UE to provide the VoIP service, the BS initializes a VoIP session (step S110). VoIP is a communication service technique in which communication is achieved by converting voice data into IP data packets. A VoIP packet denotes a voice packet using VoIP.

The BS allocates radio resources for transmission/reception of the VoIP packet (step S120). The VoIP service is a real-time service in which data has to be transmitted/received without a delay. Therefore, persistent resources in frequency/time domains are allocated for the VoIP packet. In this case, the BS reports necessary information to the UE. The information may be a modulation and coding rate applied to transmission/reception of the VoIP packet.

The BS dynamically manages the persistent resources allocated for transmission/reception of the VoIP packet (step S130). The VoIP packet is not persistently transmitted/received between the BS and the UE. The VoIP service operates in two periods, i.e., a talk period and a silence period. The talk period is when the VoIP packet is persistently transmitted/received. The silence period is when the transmission/reception of the VoIP packet is temporarily suspended. That is, according to whether radio resources are allocated or not, the VoIP service operates either in the talk period or in the silence period. Although the persistent resources are allocated for the transmission/reception of the VoIP packet, when the VoIP service is actually provided between the BS and the UE, the talk period and the silence period may be repeatedly present. During the silence period, no data is carried on the persistent resources, which results in waste of radio resources. Therefore, to reduce the waste of radio resources, the BS releases the persistent resources and declares the silence period. In this case, the released persistent resources may be allocated to a different user or may be used to transmit different type of data. After declaring the silence period, if the BS receives a VoIP packet retransmission request or if the BS has a VoIP packet to be transmitted to the UE, the BS activates the persistent resources and declares the talk period.

When the VoIP session is closed between the BS and the UE, the BS releases the persistent resources and terminates the VoIP service (step S140).

Figure 4:
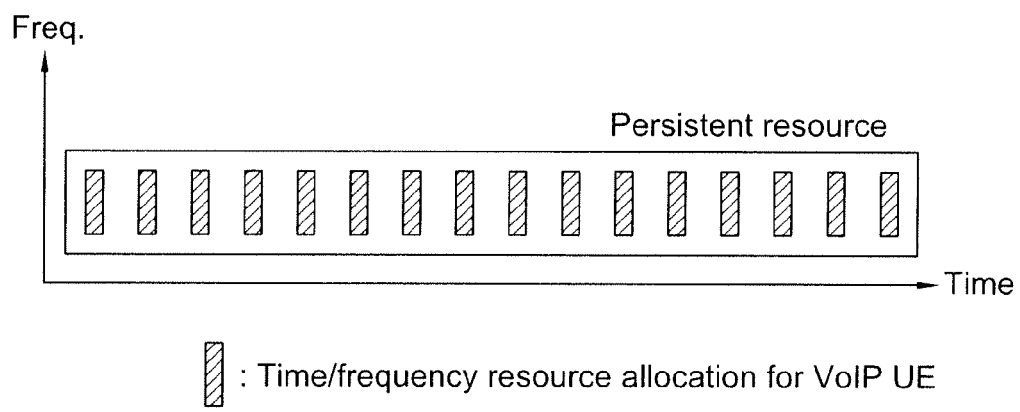
FIG. 4 shows an example of persistent resources allocated for transmission/reception of a voice over Internet protocol (VoIP) packet.

FIG. 4 shows an example of persistent resources allocated for transmission/reception of a VoIP packet.

Referring to FIG. 4, a certain resource region in frequency/time domains is occupied by persistent resources. In general, specific portions of the frequency/time domains are occupied by the persistent resources until a VoIP session is closed. According to an interval for generating the VoIP packet, uplink and downlink radio resources in the same frequency domain can be periodically allocated as the persistent resources.

Figure 5:
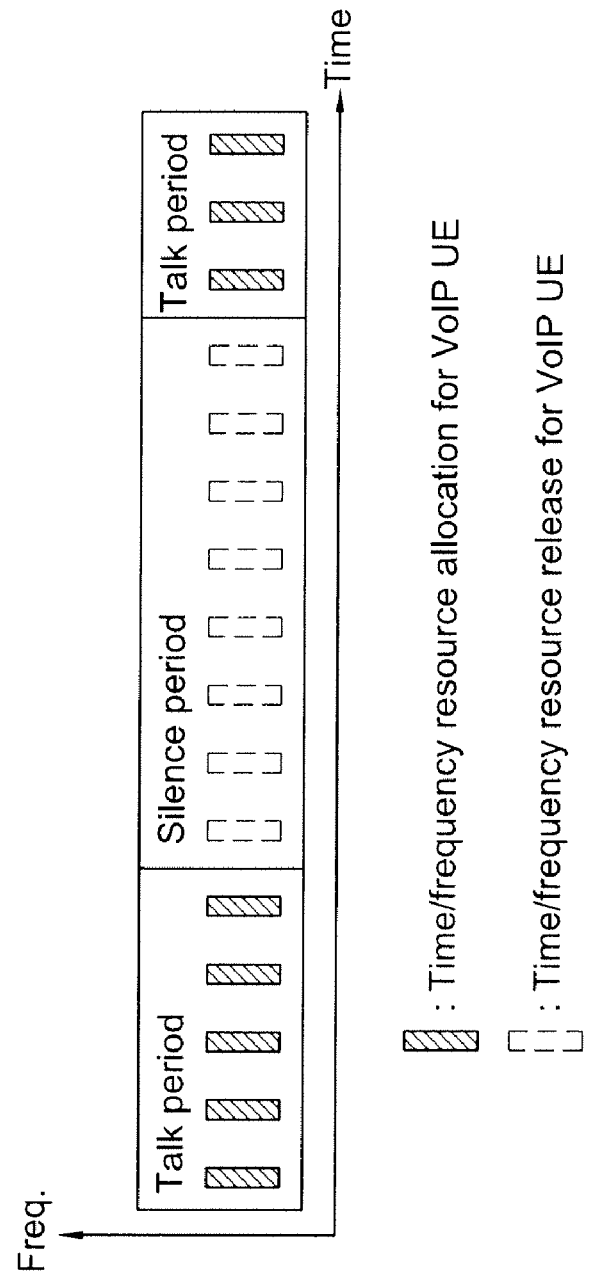
FIG. 5 shows a talk period and a silence period when using persistent resources allocated for transmission/reception of a VoIP packet.

FIG. 5 shows a talk period and a silence period when using persistent resources allocated for transmission/reception of a VoIP packet.

Referring to FIG. 5, a persistent resources is released when a VoIP service transitions from the talk period to the silence period. In addition, the persistent resources is reallocated when the VoIP service transitions from the silence period to the talk period. A message or a descriptor may be used to indicate the transition from the talk period to the silence period. Further, a control message may be used to indicate when a UE requests for a BS VoIP service transition or when the BS reports to the UE the transition from the silence period to the talk period.

Now, a process of transitioning from a talk period to a silence period will be described.

Figure 6:
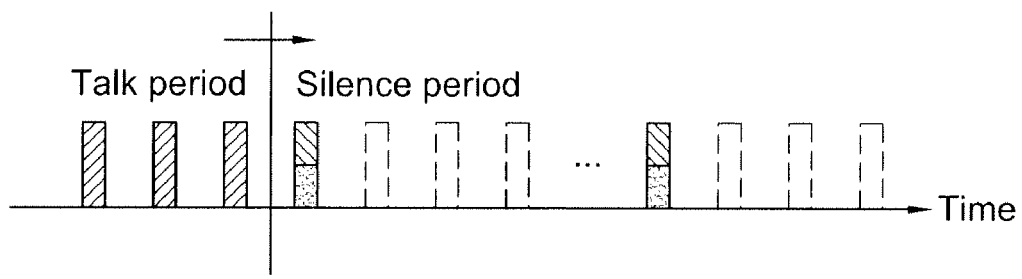
FIG. 6 shows a method for transitioning from a talk period to a silence period according to an embodiment of the present invention.

FIG. 6 shows a method for transitioning from a talk period to a silence period according to an embodiment of the present invention.

Referring to FIG. 6, a silence descriptor is used to indicate the transition from the talk period to the silence period. The silence descriptor may be determined and generated by a MAC layer of the BS or the UE. The silence descriptor indicates that the silence period is inserted during the VoIP service. The silence descriptor can be referred to as a silence insertion descriptor (SID). The silence descriptor may also be referred to as a release request message which is used when the UE requests the BS to temporarily release persistent resources. The SID can be transmitted at a 1st transmission time interval (TTI) in the silence period. The SID has a smaller size than a VoIP packet. For example, if the VoIP packet has a size of about 40 bytes, the SID may have a size of about 20 bytes. The persistent resources is allocated to have a size enough for transmitting the VoIP packet with a size of about 40 bytes. Therefore, a silence period transition message can be transmitted on a MAC layer or an upper layer (e.g., RLC layer) together with the SID through the persistent resources. The silence period transition message is transmitted to the MAC layer or the upper layer. Thus, it is reported that the VoIP service is transitioned to the silence period. During the silence period, the silence period transmission message may be periodically transmitted or may be repetitively transmitted when necessary.

Figure 7:
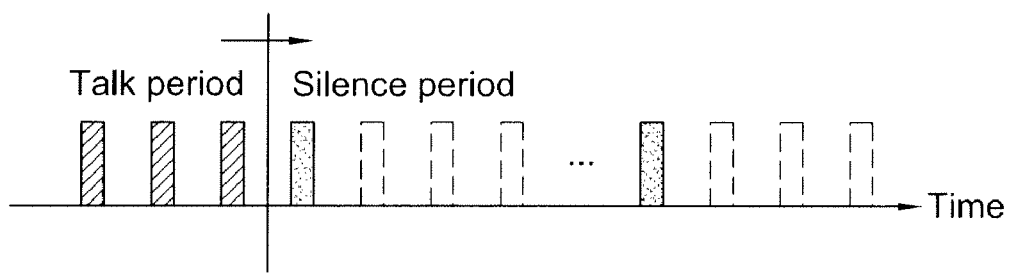
FIG. 7 shows a method for transitioning from a talk period to a silence period according to another embodiment of the present invention.

FIG. 7 shows a method for transitioning from a talk period to a silence period according to another embodiment of the present invention.

Referring to FIG. 7, a MAC or RLC level message is used to indicate transition from the talk period to the silence period. A buffer status report (BSR) message can be used as the MAC message indicating the transition from the talk period to the silence period. The BSR message can be transmitted using MAC signaling. The BSR message indicates data buffered in a logical channel of a MAC layer. When the BSR message indicates that there is no buffered data (i.e., buffer status=0), it may represent the start of the silence period. When the BSR message indicating 'buffer status=0' may be transmitted at a 1st TTI at which the silence period starts, it may represent the start of the silence period. In uplink VoIP packet transmission, the UE may transition to the silence period after transmitting the BSR message indicating 'buffer status=0'. In downlink VoIP packet transmission, the BS may report the transition to the silence period by transmitting the BSR message indicating 'buffer status=0'. During the silence period, the BSR message may be transmitted periodically or repetitively when necessary.

Figure 8:
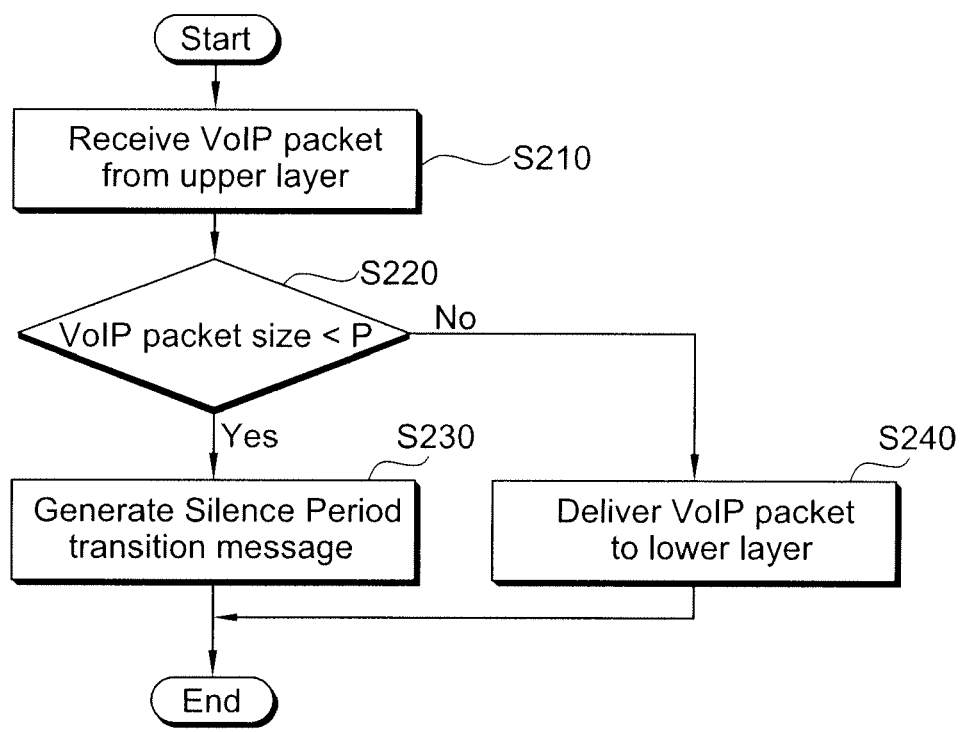
FIG. 8 is a flowchart showing a method for detecting transition to a silence period according to an embodiment of the present invention.

FIG. 8 is a flowchart showing a method for detecting transition to a silence period according to an embodiment of the present invention.

Referring to FIG. 8, the transition from the talk period to the silence period can be detected by a MAC layer of a BS or a MAC layer of a UE.

A VoIP packet is received from an upper layer (step S210). A size of the VoIP packet is compared with a predetermined reference value P (step S220). The reference value may be a default value predetermined by the upper layer or may be reported by the BS to the UE. The reference value can be determined as follows.

SID packet size≦P≦minimum VoIP packet size

That is, the reference value can be determined to be greater than a silence descriptor size and to be less than a minimum VoIP packet size.

If the size of the VoIP packet received from the upper layer is less than the reference value P, a silence period transition message is generated (step S230). Since the size of the VoIP packet received from the upper layer is less than the minimum VoIP packet size, it can be known that the received packet is an SID packet not a general VoIP packet. The SID packet may include a subscriber identify module (SIM) for identifying the UE.

If the size of the VoIP packet received from the upper layer is greater than the reference value P, the VoIP packet is transmitted to a lower layer (i.e., PHY layer) (step S240).

Meanwhile, to confirm release of the persistent resources as a result of the transition to the silence period, a resource release confirmation message may be transmitted in response to the silence descriptor or the silence period transition message. The silence period transition message includes persistent resources control information for persistent resources management. The persistent resources control information includes a variety of information required to transmit the VoIP packet. The persistent resources control information can be used for re-activation of the persistent resources not only when the persistent resources is released but also when transition is made from the silence period to the talk period. The resource release confirmation message may be transmitted through an L1/L2 control channel at a 1st TTI at which the radio resource is released. Table 1 shows an example of the persistent resources control information.

TABLE 1

| Field | Information |
| --- | --- |
| Flag | indicate control signal for persistent resources |
| DL/UL | specify downlink or uplink |
| Time/Frequency Resource | indicate resource region of persistent resources |
| MCS | modulation and coding rate information |
| Operation | release or re-activation of persistent resources |
| others | control information required to transmit VoIP packet(e.q., MOMO scheme) |

Modulation and coding scheme (MCS) information may be reported using a modulation scheme and a coding rate or using a modulation scheme and a transport block size. Persistent resources control information may be transmitted in a format of a MAC protocol data unit (PDU) of a MAC layer. If the persistent resources control information cannot be transmitted using an additional message, the persistent resources control information may be transmitted by being included in scheduling information (i.e., scheduling grant) used in transmission of other data. The persistent resources control information can be represented by being included in the scheduling information. Since the UE has received the silence descriptor or the silence period transition message, the UE can recognize the scheduling information as the silence period transition message. For example, the persistent resources is released when a size of a resource region of the persistent resources allocated to the UE is set to zero in the scheduling information or when the transport block size is set to zero in the scheduling information.

Now, transitioning from a silence period to a talk period will be described.

Figure 9:
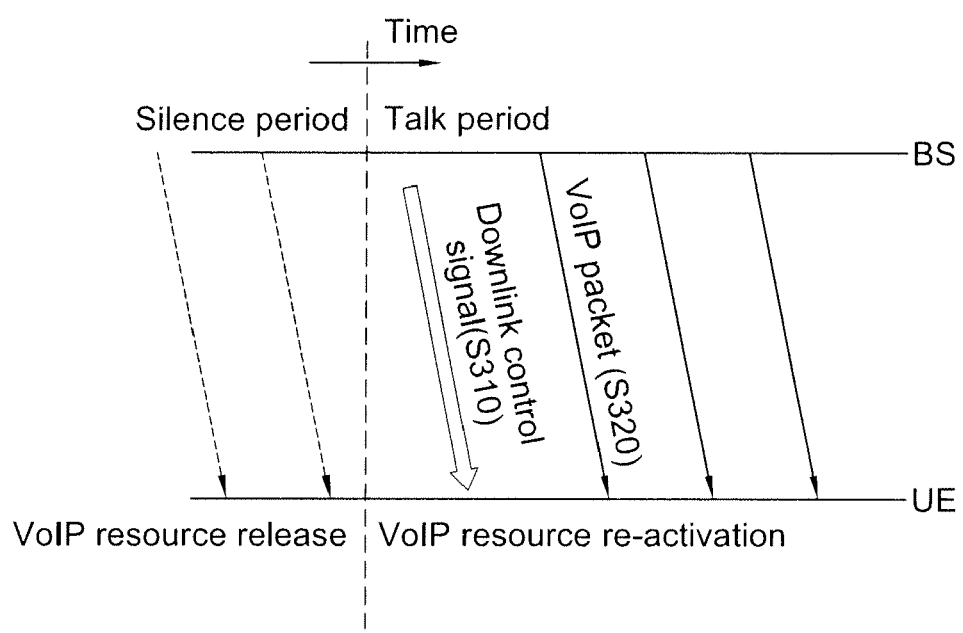
FIG. 9 shows a method for transitioning from a silence period to a talk period according to another embodiment of the present invention.

FIG. 9 shows a method for transitioning from a silence period to a talk period according to another embodiment of the present invention. This is a case where a VoIP packet is transmitted in downlink.

Referring to FIG. 9, a persistent resource is released in the silence period, and other type of data can be transmitted using the VoIP persistent resource. The transition from the silence period to the talk period can be made when a VoIP packet is generated, wherein the VoIP packet is to be transmitted in downlink by a BS. When the downlink VoIP packet is delivered via an access gateway (aGW), a buffer of the BS is in a state other than 'Null'.

When the VoIP packet is buffered in the butler of the BS, the BS can transmit a DL control signal or a DL Persistent resource re-activation message on a DL control channel (step S310). To prevent a transmission delay of the VoIP packet, transition to the talk period can be reported by the DL control signal in every TTI. The DL persistent resource re-activation message can include the persistent resources control information of Table 1 above. The 'Operation' field of Table 1 above can be set to 're-activation' to indicate the persistent resource re-activation message. When the persistent resources region changes according to a channel condition or the like, the BS may report the changed persistent resources region through the DL persistent resource re-activation message. When the BS reports the changed persistent resources region, a 'Time/Frequency resource' field, a 'MCS' field, etc., included in the DL persistent resource re-activation message may be set to a value corresponding to a new persistent resources value.

The UE receives the VoIP packet according to the DL control signal or the DL persistent resource re-activation message (step S320). The UE may receive the VoIP packet according to 'Time/Frequency resource', 'MCS', etc., which are newly configured in the DL persistent resource re-activation message.

Meanwhile, instead of additionally transmitting the DL persistent resource re-activation message, the BS may report the transition from the silence period to the talk period by using scheduling information (i.e., scheduling grant). Through the scheduling information, the BS can report again the previously configured persistent resources or report a new persistent resources. Thus, the BS can inform the UE of the transition from the silence period to the talk period. The UE receives the VoIP packet by using the persistent resources specified in the scheduling information.

Figure 10:
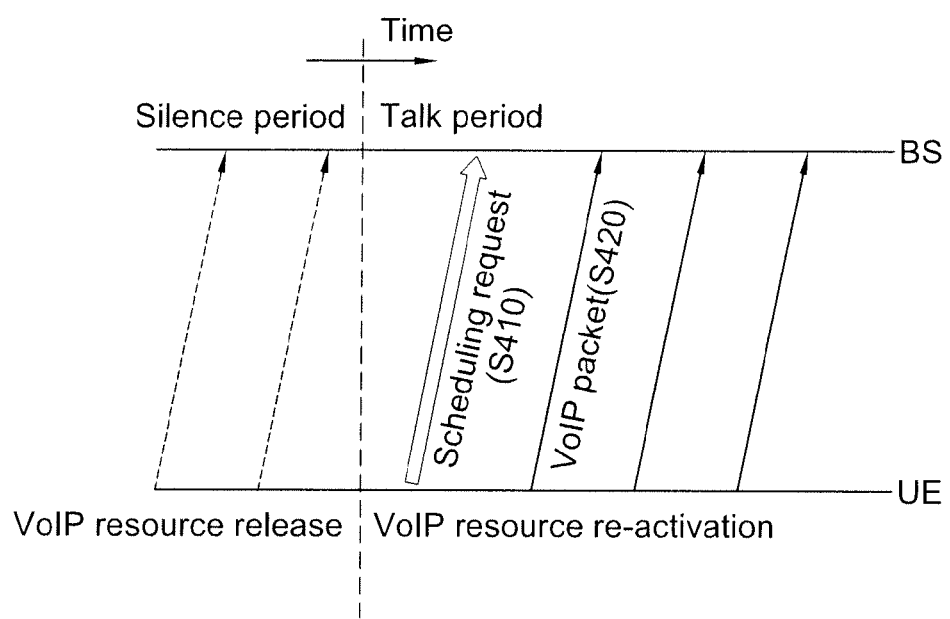
FIG. 10 shows a method for transitioning from a silence period to a talk period according to another embodiment of the present invention.

FIG. 10 shows a method for transitioning from a silence period to a talk period according to another embodiment of the present invention. This is a case where a VoIP packet is transmitted in uplink.

Referring to FIG. 10, the transition from the silence period to the talk period can be made at the request of a UE when an uplink VoIP packet is generated and transmitted.

When the uplink VoIP packet is generated, the UE transmits a scheduling request (SR) message to a BS (step S410). When a dedicated control channel is periodically assigned to the UE, the UE can transmit the SR message through the dedicated control channel. The SR message can include the persistent resources control information of Table 1 above. The SR message can be an indicator having a size of 1 bit or several bits. In this case, the SR message indicates the presence of the VoIP message to be transmitted in uplink.

Upon receiving the SR message from the UE, the BS re-activates persistent resources and receives an uplink VoIP packet by using the persistent resources (step S420). When the SR message with a size of 1 bit or several bits is transmitted, the VoIP packet is transmitted/received using a frequency band of the previously allocated persistent resources without alteration. When a channel condition changes and the UE requests a frequency band that is different from the previously allocated persistent resources through the SR message, the BS can allocate the frequency band requested by the UE as a new persistent resources.

Meanwhile, the BS can report scheduling information (i.e., scheduling grant) in response to the SR message of the UE. The scheduling information can include persistent resources allocation information and a MAC control message. The scheduling information can act as an indicator indicating the transition from the silence period to the talk period. The UE transmits the VoIP packet by using the persistent resources. Further, the UE can report to the BS the transition by transmitting the MAC control message. The MAC control message can define a MAC control PDU for indicating the transition. The MAC control message can be transmitted in the format of a report message that reports a buffer statue of the UE. If transmission of the MAC control message is delayed and thus re-activation of the persistent resources is delayed, transmission of a 1st VoIP packet to an nth VoIP packet in the talk period can be ignored. For example, when the VoIP packet is transmitted with an interval of 20 ms, and when the transmission of n VoIP packets are delayed, a (n+1)th VoIP packet may be transmitted with a delay of n*20 ms. Therefore to reduce such a delay, initial VoIP packets can be ignored when transition is made from the silence period to the talk period. The VoIP packet can be transmitted after a transition time elapses. The transition time denotes a time required for transitioning from the silence period to the talk period. Therefore, when transition is made from the silence period to the talk period, the VoIP packet and the MAC control message can be transmitted simultaneously.

Figure 11:
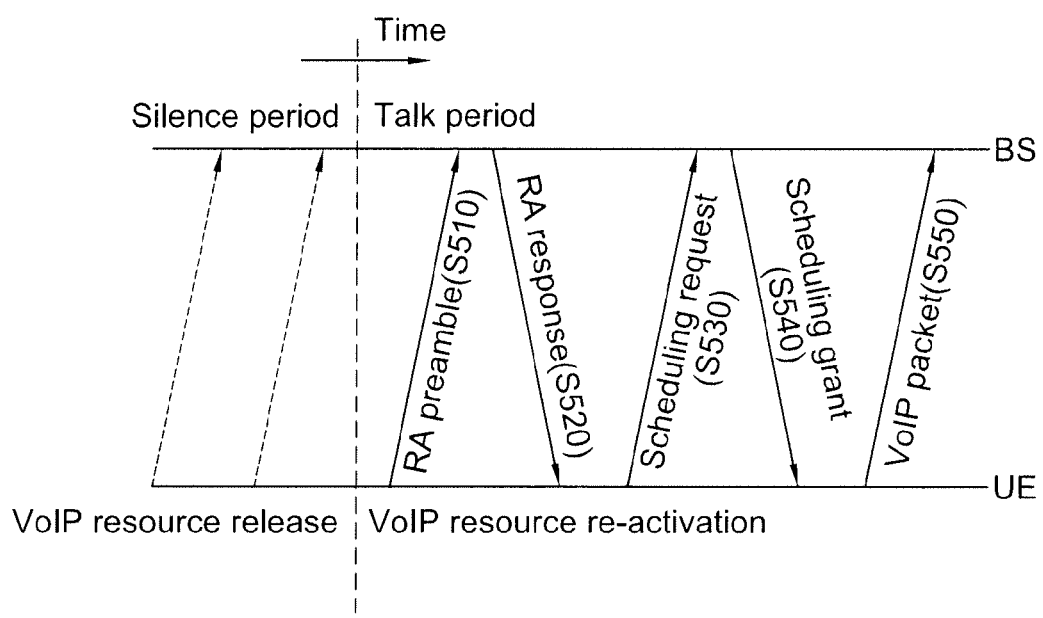
FIG. 11 shows a method for transitioning from a silence period to a talk period according to another embodiment of the present invention.

FIG. 11 shows a method for transitioning from a silence period to a talk period according to another embodiment of the present invention. This is a case where random access is performed to obtain a persistent resources.

Referring to FIG. 11, when a dedicated control channel is not assigned to a UE, the UE performs random access (RA). Then, the persistent resources is allocated to the UE, and the UE transmits a VoIP packet.

When an uplink VoIP packet is generated, the UE transmits an RA preamble to a BS (step S510). The RA preamble is transmitted on a random access channel (RACH) that can be used by a plurality of UEs. The UE generates a random signature and appends the random signature to the RA preamble. Then, the UE transmits the resultant RA preamble to the BS on the RACH.

The BS transmits an RA response to the UE (step S520). The RA response includes timing offset information (i.e., time advance (TA)) and uplink radio resource assignment for scheduling request of the UE.

The UE transmits an SR message for transmission of the VoIP packet to the BS by using the allocated uplink radio resource (step S530). The SR message can include a persistent resources control message. The UE may request a frequency band of the previously used persistent resources without alteration or may request a new frequency band suitable for a changed channel condition.

The BS transmits scheduling information (e.g., scheduling grant) in response to the SR message of the UE (step S540). The scheduling information can include persistent resources allocation information.

The UE transmits the uplink VoIP packet by using the persistent resources allocated based on the scheduling information (step S550).

FIG. 12 shows a method for transitioning from a silence period to a talk period according to another embodiment of the present invention.

Referring to FIG. 12, in the process of transition from the silence period to the talk period, a UE can transmit an SR message with a size of several bits. The BS can report the transition by appending information of several bits to the previous scheduling information (i.e., scheduling grant) in response to the SR message of the UE.

Table 2 shows an example of the SR message. This is a case where 2-bit information is represented using a quadrature phase shift key (QPSK) modulation scheme.

TABLE 2

| 00 | Normal SR request OFF |
| 01 | Normal SR request ON |
| 10 | VoIP silent to talk period transition |
| 11 | VoIP RTCP transmission request |

In Table 2, '00' denotes that normal scheduling is not requested. It indicates that there is no VoIP packet to be transmitted in a case where the UE in the silence period has to periodically report to the BS a presence/absence of a VoIP packet. '01' denotes a normal scheduling request. In this case, the persistent resources is requested when the UE has a VoIP packet to be transmitted. '10' denotes transition from the silence period to the talk period. '11' denotes that transmission of a VoIP RTP control protocol (RTCP) is requested. The RTCP is a protocol for controlling a real-time transport protocol (RTP) that is a voice streaming protocol. When the SR message includes '11' for requesting transmission of the RTCP, the BS schedules radio resources for transmission of the VoIP RTCP and the UE transmits the VoIP RTCP in uplink. Scheduling information in response to the SR message can additionally include information of Table 2 above.

From the time of scheduling request transmission to the time of uplink VoIP packet transmission, it takes a transition time TSR. The transmission time denotes the time required for the transition. If no error occurs in scheduling request and scheduling information transmission, the transition time TSR can be set to a minimum time. For example, when each processing time required for transmission of scheduling request, scheduling information and a 1st uplink VoIP packet is 2 ms respectively, the transition time TSR can be set to 6 ms. To avoid a transmission delay of the VoIP packet, the VoIP packet can be ignored during the transition time, and a MAC control message indicating transition from the silence period to the talk period can be transmitted together with the VoIP packet simultaneously.

(2) A Method for Transmitting Non-Voice Data in a VoIP Service

Hereinafter, for the purpose of distinction from the VoIP packet, data packet other than a VoIP packet will be referred to as non-voice data. As described above, generally, persistent scheduling is applied to the VoIP packet, and dynamic scheduling is applied to the non-voice data. However, dynamic scheduling may also be applied to the VoIP packet according to conditions. Persistent scheduling information may also be referred to as a persistent uplink grant transmitted on a physical downlink control channel (PDCCH). In addition, the persistent scheduling information may be referred to as a persistent UL-MAP.

A next generation mobile communication system is a high-speed, high-volume communication system capable of processing and transmitting a variety of information such as video, radio data, etc., beyond a voice-oriented service. Therefore, during the VoIP service it can frequently happen that the BS may transmit non-voice data to the UE, or the UE may transmit the non-voice data to the BS. When the BS transmits the non-voice data to the UE during the VoIP service, the BS prepares additional radio resources for non-voice data and transmits associated scheduling information. However, when the UE has to transmit the non-voice data during the VoIP service, the UE requests the BS to allocate additional radio resources, and in response thereto, the BS allocates the additional radio resources. In this process, a definitive protocol related to signaling between the BS and the UE is necessary for successful transmission of uplink non-voice data. Hereinafter, scheduling information corresponding to dynamic scheduling and persistent scheduling is referred to as dynamic scheduling information, and persistent scheduling information respectively.

Figure 13:
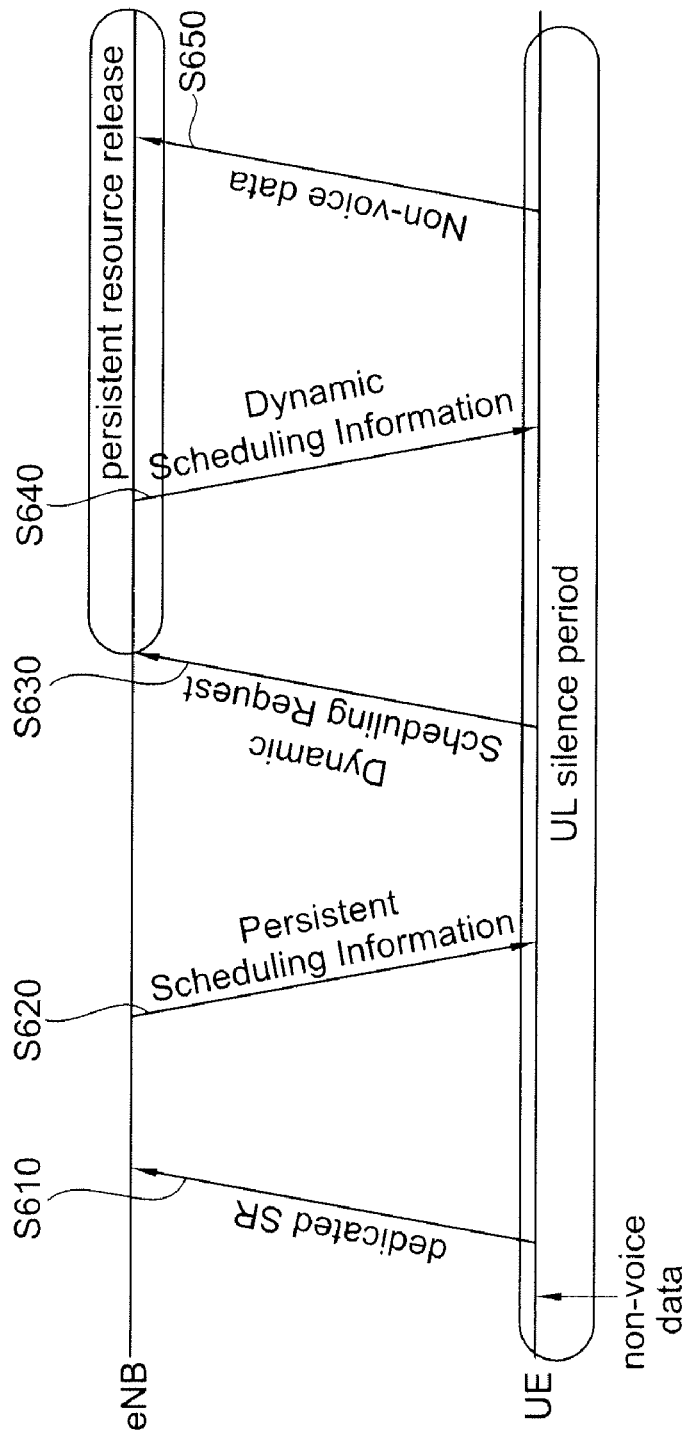
FIG. 13 is a flow diagram showing a method for transmitting non-voice uplink (UL) data in a VoIP service according to an embodiment of the present invention.

FIG. 13 is a flow diagram showing a method for transmitting uplink non-voice data in a VoIP service according to an embodiment of the present invention. It is assumed that a uplink VoIP service currently operates in a silence period. As described above, the silence period denotes a period in which radio resources are temporarily released since no VoIP packet is transmitted/received during the VoIP service.

Referring to FIG. 13, a UE transmits a dedicated SR message to an eNB (step S610). The dedicated SR message is used when the UE requests the eNB to allocate radio resources for transmitting uplink data. The eNB detects a presence/absence of a scheduling request. That is, upon detecting a signal having a signal strength above a specific threshold, the eNB determines that the scheduling request exists. Otherwise, if the signal is not detected, the eNB determines that the scheduling request does not exist.

The UE transmits the dedicated SR message for the two causes, that is, for requesting persistent scheduling and for requesting dynamic scheduling. The persistent scheduling is applied when the uplink data is a VoIP packet. The dynamic scheduling is applied when the uplink data is non-voice data. That is, according to a type of uplink data, scheduling information transmitted by the eNB differs in terms of type and configuration.

It is very important for the eNB to know the cause of transmitting the dedicated SR message. If the eNB performs dynamic scheduling when the UE desires persistent scheduling to transmit the VoIP packet, the VoIP packet cannot be transmitted persistently. On the other hand, if the eNB performs persistent scheduling when the UE desires dynamic scheduling to temporarily transmit non-voice data, radio resources can be wasted.

There may be no problem when the dedicated SR message also informs the cause of transmission. However, the dedicated SR message is configured such that its existence can be determined by signal strength. As a result, even when the dedicated SR message is received, the eNB cannot know the cause of transmitting the dedicated SR message. Therefore, the eNB has to determine whether to transmit persistent scheduling information or dynamic scheduling information. In this case, specific scheduling information may be predetermined between the UE and the eNB or may be randomly determined. It is assumed herein that the eNB transmits the persistent scheduling information.

Since the VoIP service currently operates in the silence period, the eNB determines the dedicated scheduling request as a persistent radio resource request for transitioning to the talk period, and transmits the persistent scheduling information to the UE (step S620).

Since the UE has transmitted the dedicated SR message for non-voice data transmission, the UE expects to receive the dynamic scheduling information. However, the UE receives the persistent scheduling information, and thus transmits a dynamic SR message by using radio resources allocated according to the persistent scheduling information (step S630). In this case, the UE can transmit not only the dynamic SR message but also all or some parts of the non-voice data. The dynamic SR message is used when the UE requests the eNB to send dynamic scheduling information for non-voice data transmission. The dynamic SR message can be transmitted through a physical uplink shared channel (PUSCH). Alternatively, the dynamic SR message can be transmitted using an uplink burst.

In an exemplary case, the dynamic SR message may be a MAC control PDU generated by a MAC layer. The MAC control PDU may be referred to as a MAC control element. The MAC control PDU may be a buffer status report (BSR) MAC control PDU which informs a buffer size, i.e., a total size of data transmitted on a logical channel. The UE can regulate the BSR according to a size of uplink non-voice data to be transmitted by the UE itself. The MAC control PDU may be a newly defined MAC control PDU for a dynamic scheduling request.

In another exemplary case, the dynamic SR message may be an RLC control PDU generated by an RLC layer. The RLC control PDU may be referred to as an RLC control element. The RLC control PDU may be an RLC control PDU for an RLC status report or a newly defined RLC control PDU for a dynamic scheduling request.

In still another exemplary case, the dynamic SR message may be an RRC PDU.

Upon receiving the dynamic SR message, the eNB can know that the cause of the dedicated scheduling request in step S610 is for dynamic scheduling. Thus, the eNB releases the persistent resources and transmits the dynamic scheduling information to the UE (step S640). Herein, a size of a radio resource included in the dynamic scheduling information may be determined according to a size of the BSR. The UE transmits the uplink non-voice data to the eNB by using the radio resources allocated based on the dynamic scheduling information (step S650).

If it is predetermined that the eNB transmits the dynamic scheduling information in response to the dedicated scheduling request in step S620, the UE transmits the uplink non-voice data without having to transmit the MAC control PDU or the RLC control PDU. On the other hand, if it is predetermined that the eNB randomly determines the scheduling information in response to the dedicated scheduling request in step S620, according to whether the randomly determined scheduling information is persistent scheduling information or dynamic scheduling information, it is determined whether a MAC (or RLC) control PDU will be transmitted by the UE.

Figure 14:
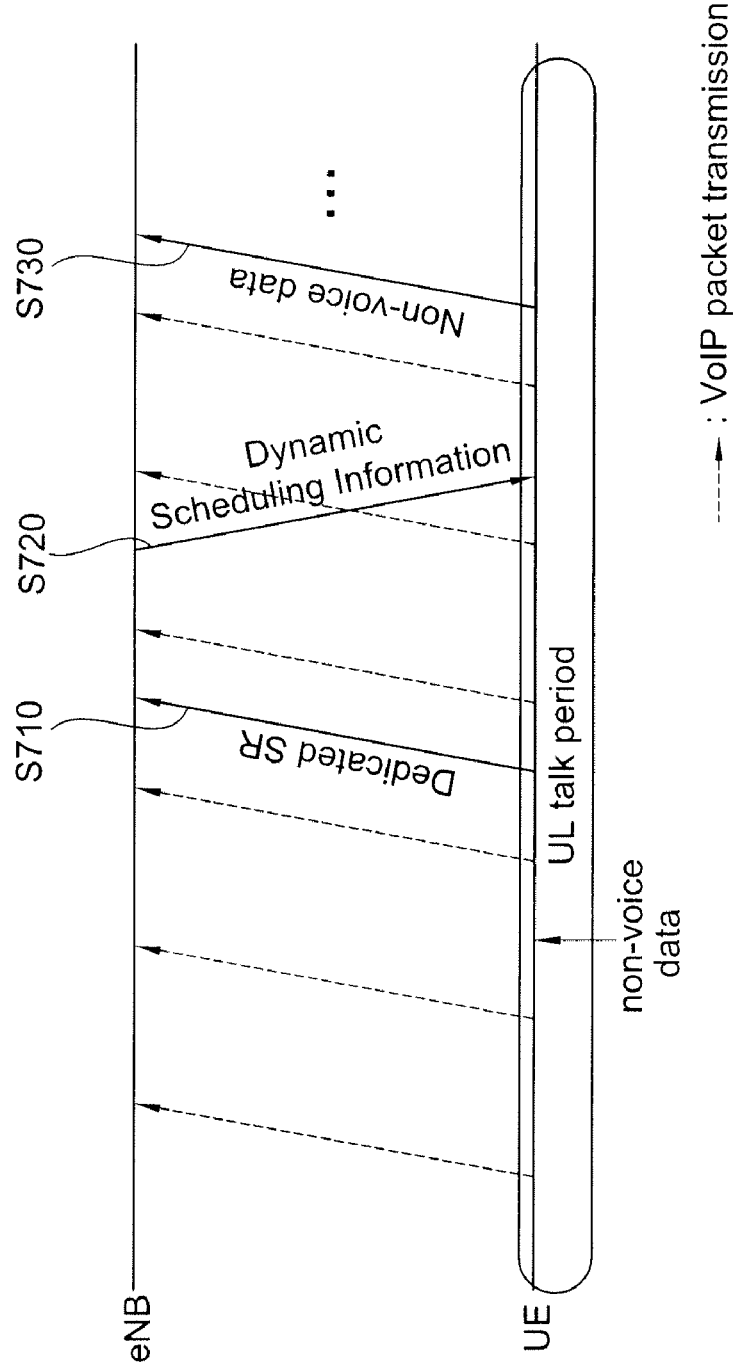
FIG. 14 is a flow diagram showing a method for transmitting uplink non-voice data in a VoIP service according to another embodiment of the present invention.

FIG. 14 is a flow diagram showing a method for transmitting uplink non-voice data in a VoIP service according to another embodiment of the present invention. It is assumed that an uplink VoIP service operates in a talk period. As described above, the talk period denotes a period in which a VoIP packet is persistently transmitted/received during the VoIP service, that is, a period in which radio resources are not released.

Referring to FIG. 14, a UE transmits a dedicated SR message to an eNB during the talk period (step S710). The dedicated SR message is used when the UE requests the eNB to allocate radio resources for transmitting uplink data. Upon receiving the dedicated SR message, the eNB has to determine whether to transmit dynamic scheduling information or persistent scheduling information. Since the VoIP service currently operates in the talk period, the eNB can know that the cause of the dedicated scheduling request is not for another persistent scheduling but for dynamic scheduling. Therefore, the eNB transmits dynamic scheduling information (step S720). According to radio resource information included in the dynamic scheduling information, the UE transmits non-voice data or a MAC control PDU or an RLC control PDU (step S730).

(3) A Method for Transmitting Uplink Data in a Silence Period of a VoIP Service

The uplink data includes a VoIP packet, an SID, and non-voice data. Each element of the uplink data may require different scheduling information. For example, persistent scheduling is required for VoIP packet transmission and dynamic scheduling information is required for SID (or non-voice data) transmission. In order for a UE to transmit the uplink data in the silence period of the VoIP service, radio resources have to be first assigned in any forms. To request allocation of the radio resources, the UE transmits a dedicated SR message to an eNB.

The dedicated SR message may be able to distinguish a type of uplink data. Or the dedicated SR message may not be able to distinguish it. In the former case, the dedicated SR message is a signal detected by coherent detection. In the latter case, the dedicated SR message is a signal detected by non-coherent detection. In the former case, the number of cases that the dedicated SR message can represent increases according to a modulation scheme. Thus, the dedicated SR message can include information indicating the type of the uplink data. On the contrary, in the latter case, scheduling request is determined only by way of presence/absence of a signal as described above, and thus the dedicated SR message cannot include the information on the type of the a presence/absence of data. The former and latter cases are different in terms of whether the eNB needs to decode the dedicated SR message.

Now, a method for transmitting uplink data in a silence period of a VoIP service will be described with respect to the aforementioned former and latter cases of the dedicated SR message. First, the former case where the dedicated SR message is a signal detected by coherent detection will be described. Table 3 below shows a case where binary phase shift keying (BPSK) is used for the dedicated SR message as a modulation scheme.

TABLE 3

|  | ON | |
| --- | --- | --- |
| OFF | −1 | 1 |
| No dedicated SR | Persistent Scheduling Request | Dynamic Scheduling Request |

Referring to Table 3, the dedicated SR message can be expressed in 3 types, that is, a first type in which the dedicated SR message is not transmitted (indicated by OFF in Table 3), a second type in which the dedicated SR message has a value of −1, and a third type in which the dedicated SR message has a value of 1. When the dedicated SR message has a value of −1, it indicates that the UE requests the eNB to perform persistent scheduling. When the dedicated SR message has a value of 1, it indicates that the UE requests the eNB to perform dynamic scheduling. As such, by using the dedicated SR message, a type of scheduling information desired by the UE can be distinguished.

Table 4 below shows a case where quadrature phase shift keying (QPSK) is used for the dedicated SR message as a modulation scheme.

TABLE 4

|  | ON | | | |
| --- | --- | --- | --- | --- |
| OFF | 00 | 01 | 10 | 11 |
| No dedicated SR | VoIP SID | VoIP packet | Other purpose | Non-voice data |

Referring to Table 4, the dedicated SR message can be expressed in 5 types, that is, a first type in which the dedicated SR message is not transmitted (indicated by OFF in Table 3), and second to fourth types in which the dedicated SR message has a value of 00, 01, 10, and 11, respectively. When the dedicated SR message has a value of 00, it indicates that the uplink data is an SID. When the dedicated SR message has a value of 01, it indicates that the uplink data is a VoIP packet. When the dedicated SR message has a value of 11, it indicates that the uplink data is non-voice data. When the dedicated SR message has a value of 10, it indicates that the SR message can be used for other causes. When the UE transmits the dedicated SR message, the eNB may select scheduling information suitable for the type of uplink data according to the indication of the dedicated SR and thus transmit the selected scheduling information to the UE.

It has been described above with reference to Tables 3 and 4 that the dedicated SR message is a signal detected by coherent detection. Now, the latter case where the dedicated SR message is detected by non-coherent detection will be described. In the non-coherent detection, scheduling request is determined only by way of presence/absence of a signal. Thus, the UE first transmits the dedicated SR message in order to obtain radio resource allocation. Thereafter, in a subsequent process, the UE receives scheduling information suitable for a type of uplink data through additional signaling from the eNB.

Two types of scheduling information can be transmitted by the eNB to the UE in response to the dedicated SR message transmitted by the UE. One is persistent scheduling information and the other is dynamic scheduling information. The eNB selects one of the two types of scheduling information and then transmits the selected type of scheduling information. The scheduling information may be randomly selected, or specific scheduling information may be determined as a default. It is specified herein that the specific scheduling information is determined as a default. Of course, if even the scheduling information is randomly selected, subsequent operations are the same as those when the specific scheduling information is determined as a default.

(A) When an eNB Transmits Persistent Scheduling Information as a Default.

Figure 15:
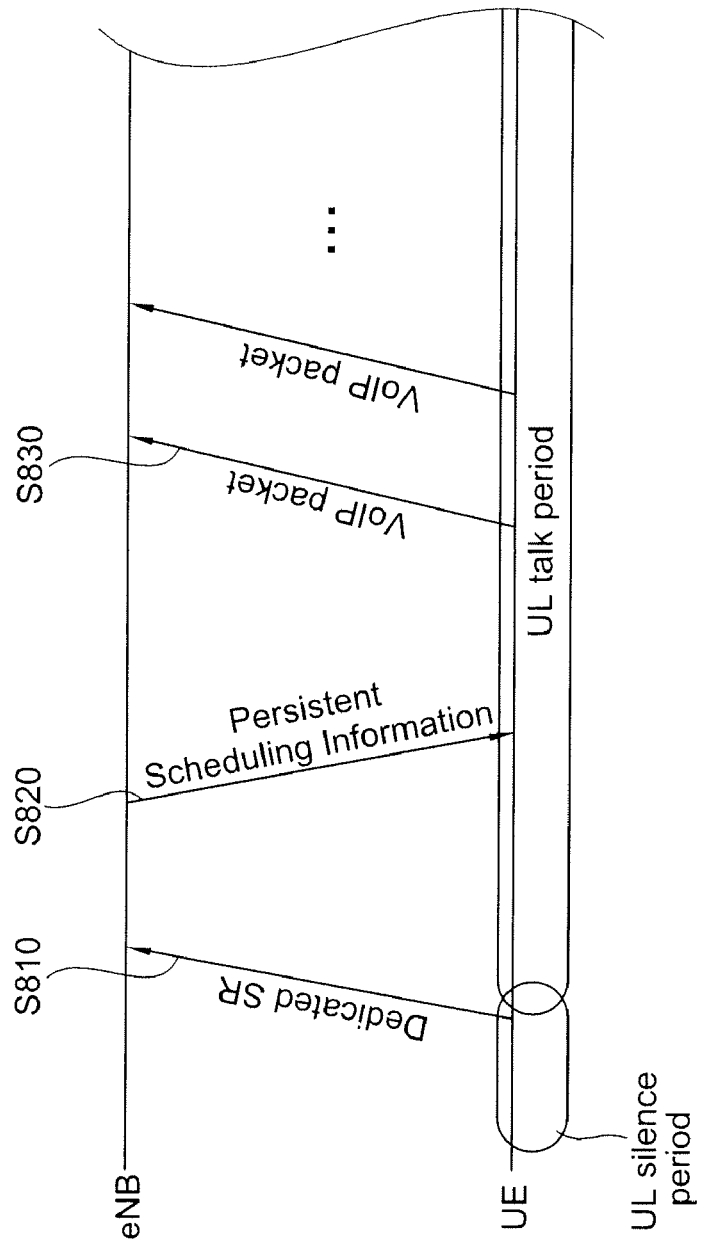
FIG. 15 is a flow diagram showing a method for transmitting uplink data in a VoIP service according to an embodiment of the present invention.

FIG. 15 is a flow diagram showing a method for transmitting uplink data in a VoIP service according to an embodiment of the present invention. This is a case where a UE transmits a dedicated SR message to transition from a silence period to a talk period. Thus the uplink data to be transmitted by the UE is a VoIP packet.

Referring to FIG. 15, when a VoIP packet is generated during the silence period, the UE transmits the dedicated SR message so that the VoIP service transitions to the talk period (step S810). An eNB transmits default persistent scheduling information to the UE (step S820). The eNB does not transmit additional scheduling information for VoIP packet after transmitting the persistent scheduling information. This is because the persistent scheduling allows a specific UE to persistently use a specific time (or frequency) resource for a specific time period after allocation is carried out one time. The VoIP packet is suitable for persistent scheduling. Therefore, without having to add extra behaviors, the UE persistently transmits the VoIP packet by using the radio resource allocated based on the persistent scheduling information (step S830).

Figure 16:
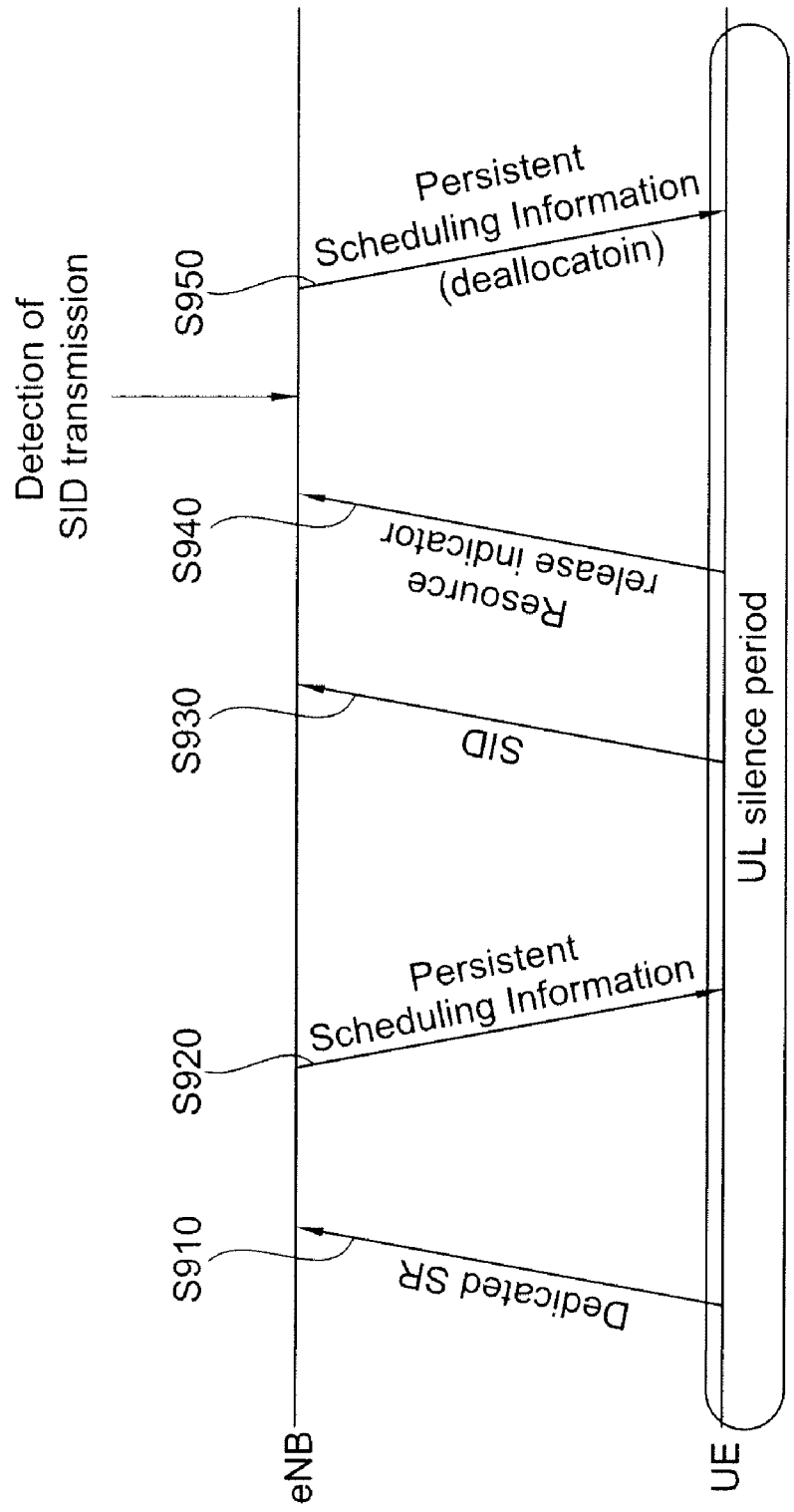
FIG. 16 is a flow diagram showing a method for transmitting uplink data in a VoIP service according to another embodiment of the present invention.

FIG. 16 is a flow diagram showing a method for transmitting uplink data in a VoIP service according to another embodiment of the present invention. This is a case where a UE intents to transmit an SID in a silence period.

Referring to FIG. 16, when a SID is generated during the silence period, the UE transmits a dedicated SR message (step S910). When an eNB receives a radio resource request from the UE, the eNB transmits default persistent scheduling information to the UE (step S920). The eNB does not transmit additional scheduling information after transmitting the persistent scheduling information. This is because the persistent scheduling allows a specific UE to persistently use a specific time (or frequency) resource for a specific time period after allocation is carried out one time.

The UE transmits the SID to the eNB by using a radio resource allocated based on the persistent scheduling information (step S930). Unlike the VoIP packet, there is no need to persistently transmit the SID. Therefore, the UE transmits a resource release indicator indicating that there is no uplink data to be additionally transmitted after transmitting the SID (step S940). The resource release indicator may be a MAC or RLC level message. The MAC message may be a BSR message. The BSR message is transmitted using MAC signaling. The BSR message indicates data buffered in a logical channel of a MAC layer. The BSR message may indicate an absence of buffered data (i.e., "buffer status=empty (or 0)") to show that there is no uplink data to be additionally transmitted.

Although it has been described that the resource release indicator is transmitted using the persistent radio resource after the SID is first transmitted, the SID and the resource release indicator may be simultaneously transmitted. The eNB releases the allocated persistent radio resource, and transmits to the UE persistent scheduling information indicating release of the radio resource (step S950).

Figure 17:
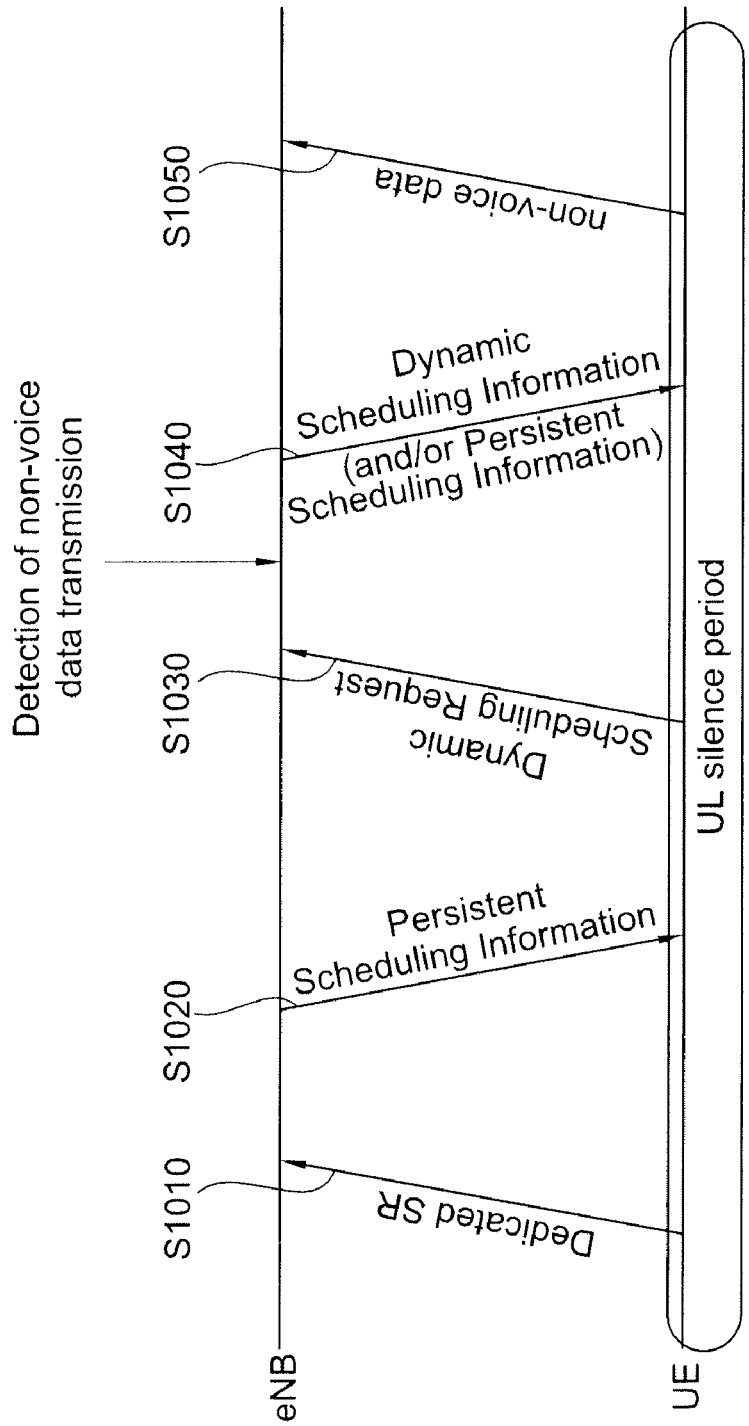
FIG. 17 is a flow diagram showing a method for transmitting uplink data in a VoIP service according to another embodiment of the present invention.

FIG. 17 is a flow diagram showing a method for transmitting Uplink data in a VoIP service according to another embodiment of the present invention. This is a case where a UE intents to transmit non-voice data in a silence period.

Referring to FIG. 17, when non-voice data is generated during the silence period, the UE transmits a dedicated SR message (step S1010). When an eNB receives a radio resource request from the UE, the eNB transmits default persistent scheduling information to the UE (step S1020). Since the UE has transmitted the dedicated SR message for non-voice data transmission, the UE expects to receive dynamic scheduling information. However, the UE receives persistent scheduling information as a default and thus transmits a dynamic SR message by using a radio resource allocated based on the persistent scheduling information (step S1030). The dynamic SR message is used when the UE requests the eNB to perform dynamic scheduling.

In an exemplary case, the dynamic SR message may be a MAC control PDU generated by a MAC layer. The MAC control PDU may be referred to as a MAC control element. The MAC control PDU may be a BSR MAC control PDU which informs a buffer size, i.e., a total size of data transmitted on a logical channel. The UE can regulate the BSR according to a size of uplink non-voice data.

In another exemplary case, the dynamic SR message may be an RLC control PDU generated by an RLC layer. The RLC control PDU may be referred to as an RLC control element. The RLC control PDU may be an RLC control PDU for an RLC status report.

The eNB releases the persistent radio resource allocated to the UE and transmits to the UE persistent scheduling information and/or dynamic scheduling information indicating release of the radio resource (step S1040). The persistent scheduling information includes an indicator indicating de-allocation of the radio resource. The UE transmits the non-voice data to the eNB by using the radio resource allocated based on the dynamic scheduling information (step S1050).

(B) When an eNB Transmits Dynamic Scheduling Information as a Default

Figure 18:
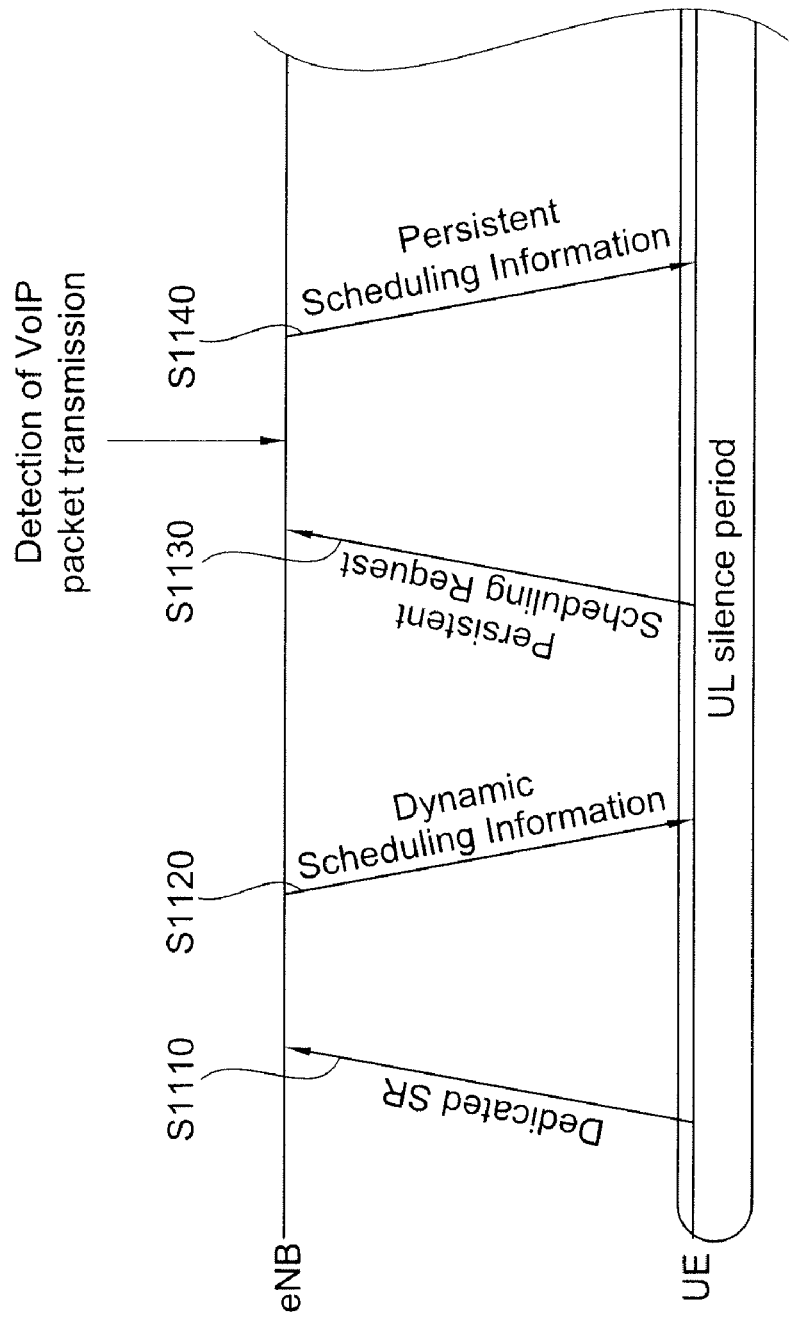
FIG. 18 is a flow diagram showing a method for transmitting uplink data in a VoIP service according to another embodiment of the present invention.

FIG. 18 is a flow diagram showing a method for transmitting uplink data in a VoIP service according to another embodiment of the present invention. This is a case where a UE transmits a dedicated SR message to transition from a silence period to a talk period. The uplink data to be transmitted by the UE is a VoIP packet.

Referring to FIG. 18, when a VoIP packet is generated during the silence period, the UE transmits the dedicated SR message so that the VoIP service transitions to the talk period (step S1110). An eNB transmits default dynamic scheduling information to the UE (step S1120). The VoIP packet is suitable for persistent scheduling. Therefore, the UE transmits a persistent SR message requesting persistent scheduling to the eNB by using the radio resource allocated based on the dynamic scheduling information (step S1130). The persistent SR message may be a MAC or RLC level message for silence indication. In this case, all or some parts of the VoIP packet may be transmitted simultaneously with the persistent SR message. Upon receiving the persistent scheduling request, the eNB transmits persistent scheduling information to the UE (step S1140).

Figure 19:
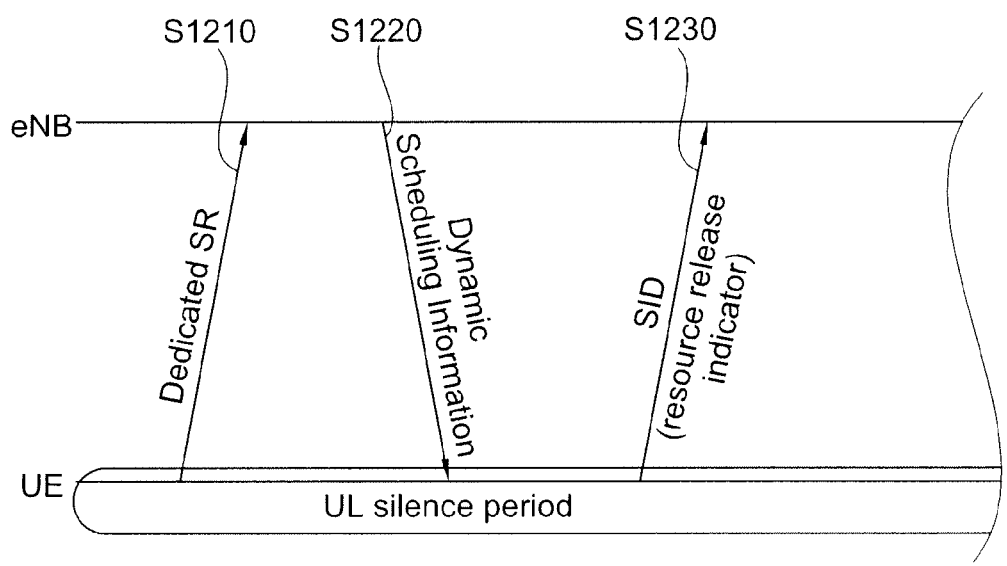
FIG. 19 is a flow diagram showing a method for transmitting uplink data in a VoIP service according to another embodiment of the present invention.

FIG. 19 is a flow diagram showing a method for transmitting uplink data in a VoIP service according to another embodiment of the present invention. This is a case where a UE intents to transmit an SID in a silence period.

Referring to FIG. 19, when a SID is generated during the silence period, the UE transmits a dedicated SR message (step S1210). When an eNB receives a radio resource request from the UE, the eNB transmits dynamic scheduling information to the UE as a default (step S1220). The UE transmits the SID to the eNB by using a radio resource allocated based on the dynamic scheduling information (step S1230). Unlike the VoIP packet, there is no need to persistently transmit the SID. Therefore, the UE transmits a resource release indicator together with the SID, wherein the resource release indicator indicates that there is no uplink data to be additionally transmitted after transmitting the SID. The resource release indicator may be a MAC or RLC level message for silence indication. The MAC message may be a BSR message. The BSR message may indicate an absence of buffered data (i.e., "buffer status=empty (or 0)") to show that there is no uplink data to be additionally transmitted.

Figure 20:
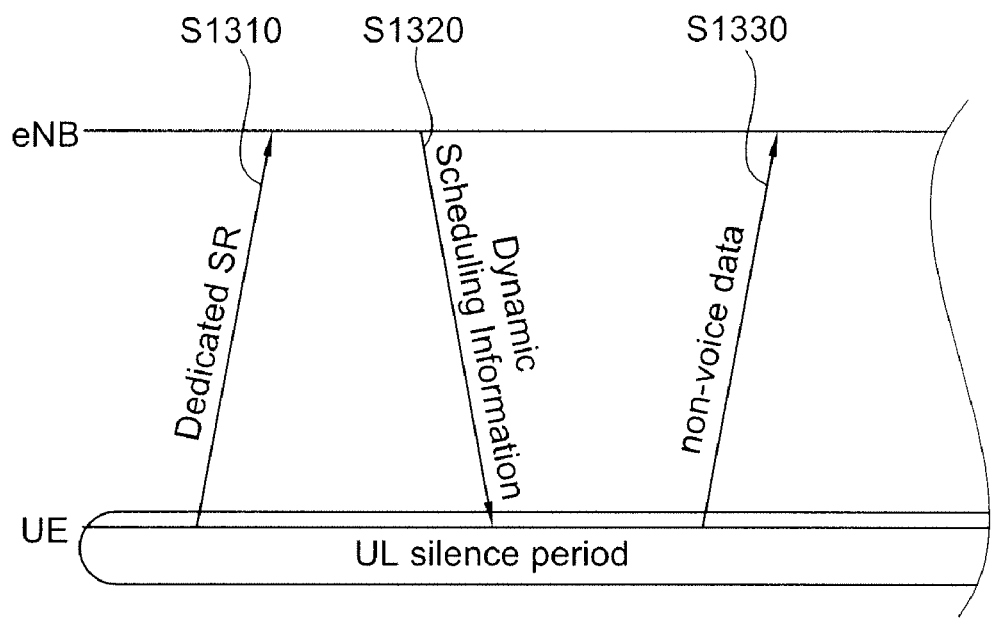
FIG. 20 is a flow diagram showing a method for transmitting uplink data in a VoIP service according to another embodiment of the present invention.

FIG. 20 is a flow diagram showing a method for transmitting uplink data in a VoIP service according to another embodiment of the present invention. This is a case where a UE intents to transmit non-voice data in a silence period.

Referring to FIG. 20, when non-voice data is generated during the silence period, the UE transmits a dedicated SR message (step S1310). When an eNB receives a radio resource request from the UE, the eNB transmits default dynamic scheduling information to the UE (step S1320). Since the UE has transmitted the dedicated SR message for non-voice data transmission, the UE expects to receive dynamic scheduling information. The UE receives dynamic scheduling information as it expected, and thus transmits the non-voice data by using a radio resource allocated based on the dynamic scheduling information (step S1330).

Figure 21:
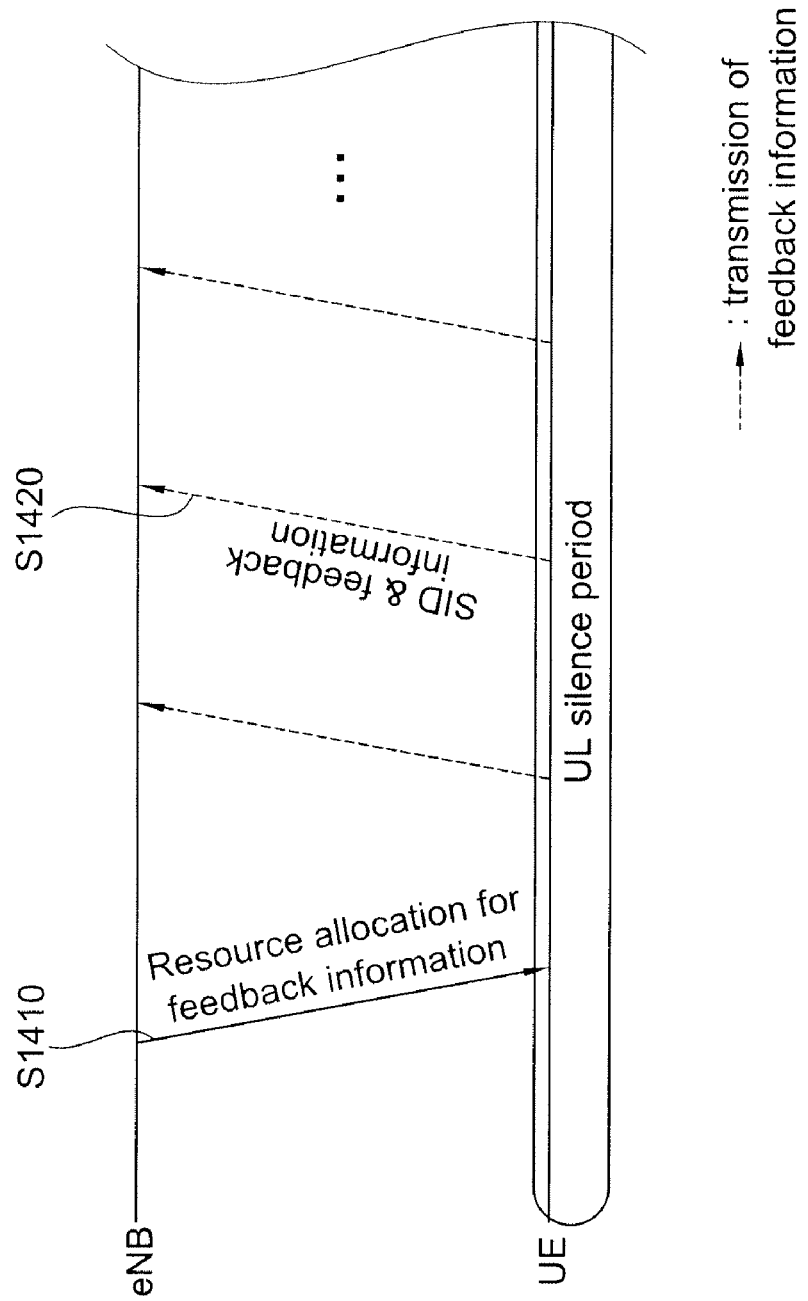
FIG. 21 is a flow diagram showing a method for transmitting uplink data in a VoIP service according to another embodiment of the present invention.

FIG. 21 is a flow diagram showing a method for transmitting uplink data in a VoIP service according to another embodiment of the present invention.

Referring to FIG. 21, an eNB allocates a feedback radio resource to a UE so that the UE can periodically or non-periodically transmit feedback information on an uplink data channel without scheduling information (step S1410). The feedback information may include a variety of information, such as scheduling request (e.g., bandwidth request (BR)) for requesting radio resource allocation, channel quality information (CQI), band selection, acknowledgement/not-acknowledgment (ACK/NACK) signal that is a response for DL data transmission, a rank indicator (RI), a precoding matrix indicator (PMI), etc. The uplink data channel may be referred to as a physical uplink shared control channel (PUSCH). The feedback radio resource may be allocated through signaling of an upper layer or a lower layer. The upper layer may be an RRC layer, and the lower layer may be a MAC layer (or an RLC layer) or a PHY layer.

When uplink data is generated, the UE transmits the uplink data to the eNB by using the feedback radio resource (step S1420). The uplink data may an SID or non-voice data. In case of transmitting the non-voice data, the UE may transmit a BSR together with the non-voice data.

(4) A Method for Retransmitting a VoIP Packet in a VoIP Service

When receiving a VoIP packet, an eNB does not transmit additional scheduling information after transmitting the persistent scheduling information. This is because the persistent scheduling allows a specific UE to persistently use a specific time (or frequency) resource for a specific time period after allocation is carried out one time. Instead of transmitting the additional scheduling information after transmitting the persistent scheduling information, the eNB feeds back an ACK/NACK signal to the UE in response to the uplink VoIP packet transmission at a predetermined time interval. The ACK/NACK signal is information indicating whether the eNB successfully or unsuccessfully receives the UL VoIP packet. The ACK signal indicates that the eNB successfully receives the VoIP packet. The NACK signal indicates that the eNB fails in receiving of the VoIP packet and thus requests the UE to retransmit the VoIP packet.

In uplink transmission according to persistent scheduling, since there is no additional uplink scheduling information, it is difficult to map an ACK/NACK signal for uplink data according to a position (or order) of a logical or physical resource by using uplink scheduling information. That is, even if the eNB feeds back the ACK/NACK signal, it may be difficult to know for which VoIP packet the ACK/NACK signal is fed back. In order to solve such a problem, a method for transmitting or retransmitting uplink data under persistent scheduling will be described.

Figure 22:
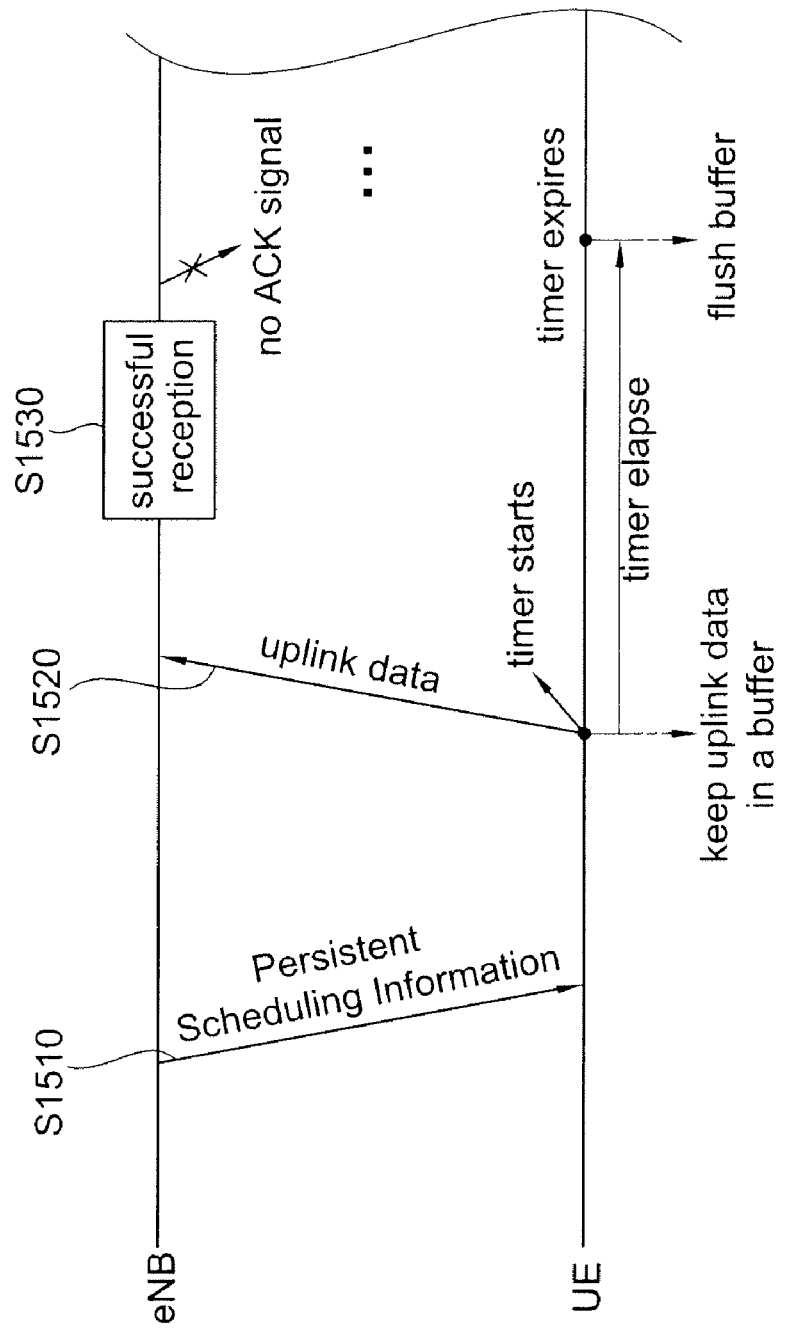
FIG. 22 is a flow diagram showing a method for transmitting uplink data applied with persistent scheduling according to an embodiment of the present invention.

FIG. 22 is a flow diagram showing a method for transmitting uplink data applied with persistent scheduling according to an embodiment of the present invention.

Referring to FIG. 22, an eNB transmits persistent scheduling information to a UE (step S1510). The persistent scheduling information may be referred to as a persistent uplink grant. The UE transmits uplink data to the eNB by using a radio resource allocated based on the persistent scheduling information (step S1520). The uplink data may be either a VoIP packet or non-voice data according to persistent scheduling.

The UE keeps the uplink data in a buffer until successful or unsuccessful reception of the uplink data is confirmed by the eNB. The uplink data may be referred to as a MAC PDU. The buffer may be referred to as a hybrid automatic repeat request (HARQ) buffer. The UE starts a timer when the uplink data is transmitted. The timer provides a time for keeping the uplink data in the buffer. The timer expires when a predetermined time elapses after the uplink data is transmitted.

It is assumed that the eNB successfully receives the uplink data (step S1530). When the uplink data is successfully received, the eNB does not transmit any feedback signal. That is, the eNB does not transmit an additional ACK signal but waits for reception of next uplink data. If the uplink data remains in the buffer when the timer expires, the UE no longer has to keep the uplink data in the buffer. Thus, the uplink data is flushed from the buffer. This is because, from the fact that the eNB does not transmit an additional feedback signal, the UE can know successful transmission of the uplink data. As such, after transmitting the uplink data, the UE verifies only a presence/absence of retransmission scheduling information without verifying the ACK/NACK signal.

Figure 23:
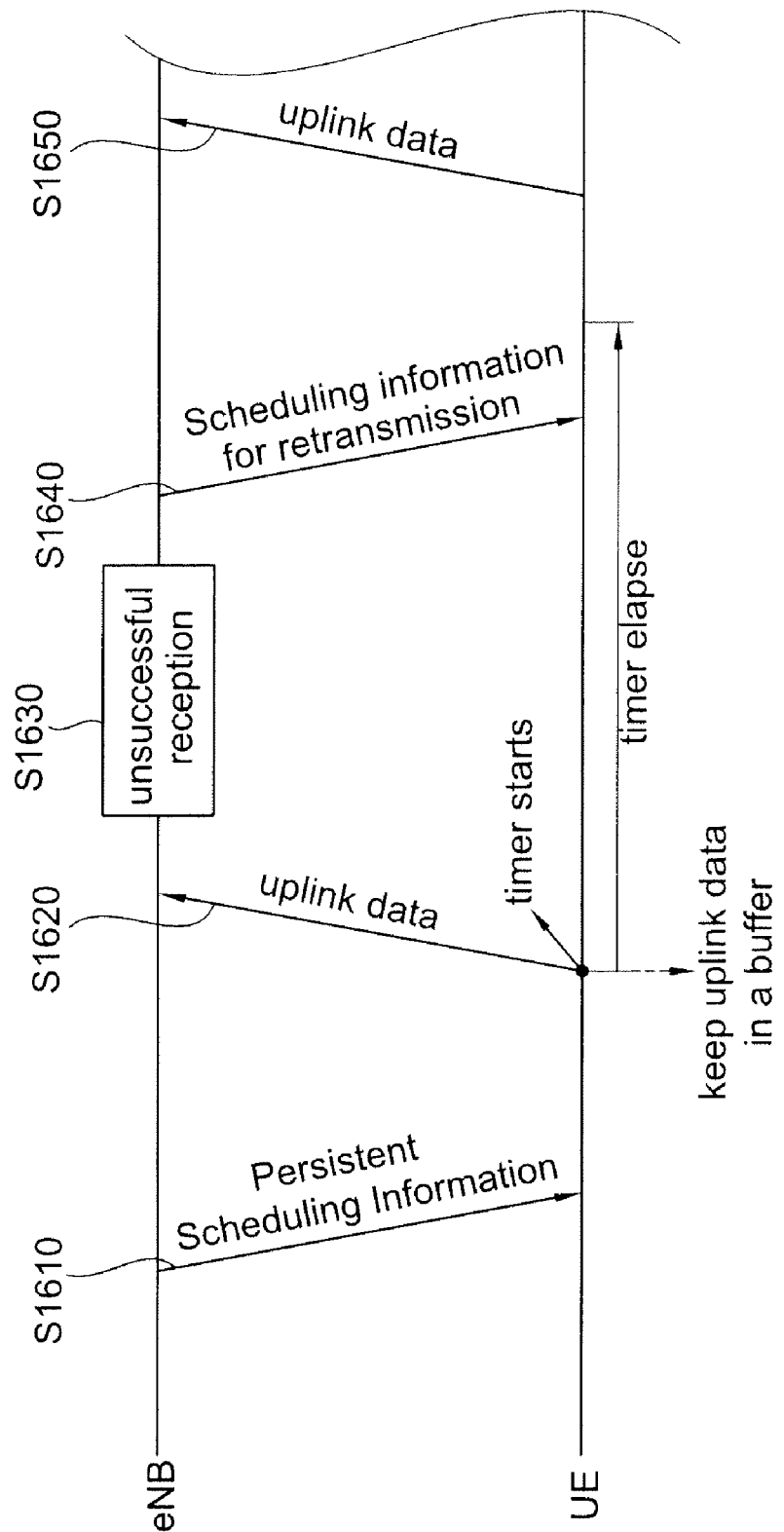
FIG. 23 is a flow diagram showing a method for transmitting uplink data applied with persistent scheduling according to another embodiment of the present invention.

FIG. 23 is a flow diagram showing a method for transmitting uplink data applied with persistent scheduling according to another embodiment of the present invention.

Referring to FIG. 23, an eNB transmits persistent scheduling information to a UE (step S1610). The persistent scheduling information may be referred to as a persistent uplink grant. The UE transmits uplink data to the eNB by using a radio resource allocated based on the persistent scheduling information (step S1620). The uplink data may be either a VoIP packet or non-voice data applied with persistent scheduling.

The UE keeps the uplink data in a buffer until successful or unsuccessful transmission of the uplink data is confirmed by the eNB. The uplink data may be referred to as a MAC PDU. The buffer may be referred to as a HARQ buffer. The UE starts a timer when the uplink data is transmitted. The timer provides a time for keeping the uplink data in the buffer. The timer expires when a predetermined time elapses after the uplink data is transmitted.

It is assumed that the eNB unsuccessfully receives the uplink data (step S1630). When the uplink data is unsuccessfully received, the eNB retransmits persistent scheduling information (step S1640). The persistent scheduling information is for retransmission of the uplink data and may include a new data indicator (NDI) indicating whether to retransmit the uplink data. That is, the eNB does not transmit an additional NACK signal but transmits the persistent scheduling information for retransmission. Thus, the eNB expects retransmission of the uplink data.

The UE can know unsuccessful transmission of the uplink data by receiving the persistent scheduling information for retransmission before the timer expires. Thus, the UE retransmits the uplink data stored in the buffer to the eNB (step S1650).

As described above, instead of using an ACK/NACK signal for uplink data as a feedback signal, a timer for each uplink data and persistent scheduling information for retransmission are used. Accordingly, the difficulty of mapping an ACK/NACK signal for uplink data to a position (or order) of a logical or physical resource can be solved.

(5) A Method for Signaling Scheduling-Related Parameters in a VoIP Service

For persistent scheduling, there are parameters to be determined between an eNB and a UE. Examples of the parameters include a persistent scheduling interval, an activation start time, an activation preparation time, resource allocation information, etc. The persistent scheduling interval denotes a time interval with which a radio resource is allocated for VoIP packet transmission. For example, if an uplink VoIP packet (or a downlink VoIP packet) is transmitted with a time interval of 20 ms according to persistent scheduling, the persistent scheduling interval is 20 ms. Of course, the persistent scheduling interval may be less than (or greater than) 20 ms according to a system or a VoIP codec.

The activation start time denotes a time at which the VoIP packet is actually transmitted/received. For example, the activation start time may indicate an absolute time position of a specific subframe so as to inform that the VoIP packet is transmitted after the specific frame. Alternatively, the activation start time may indicate a relative time position of a specific subframe (or time) elapsed after information regarding the activation start time is transmitted. The activation preparation time does not provide a time at which the VoIP packet is actually transmitted/received but provides a time to prepare for starting of the VoIP packet transmission. The allocation information is information regarding a frequency-domain (time-domain) radio resource allocated based on persistent scheduling.

The persistent scheduling information is transmitted a minimum number of times. Thus, when an error occurs in transmission of the persistent scheduling information, the VoIP packet may not be transmitted/received for a significantly long period of time. A method for signaling parameters required for persistent scheduling in order to solve such a problem will be described hereinafter.

Figure 24:
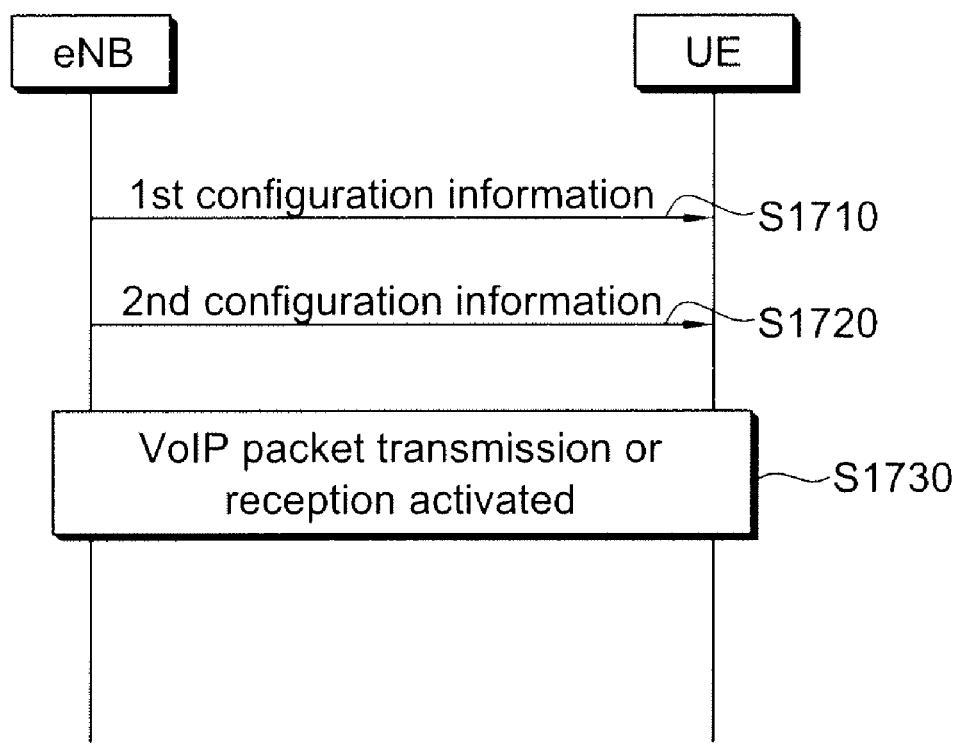
FIG. 24 is a flow diagram showing a method for transmitting a parameter for persistent scheduling according to an embodiment of the present invention.

FIG. 24 is a flow diagram showing a method for transmitting a parameter for persistent scheduling according to an embodiment of the present invention. This method equally applies not only to DL transmission but also to UL transmission.

Referring to FIG. 24, in order to apply persistent scheduling to a VoIP service, an eNB first transmits 1st configuration information (step S1710). The 1st configuration information includes some parameters for preparing an operation for transmitting/receiving a VoIP packet according to persistent scheduling. Such an operation will hereinafter be referred to as a persistent scheduling activation operation. The 1st configuration information may be included in an RRC message generated by an upper layer. The eNB transmits 2nd configuration information (step S1720). The 2nd configuration information includes a parameter for initiating the activation operation. The 2nd configuration information may be a MAC message generated by a lower layer or may be control information transmitted through a PDCCH. When the 1st configuration information and the 2nd configuration information are successfully transmitted to the UE, transmission/reception of the VoIP packet is activated between the eNB and the UE (step S1730). When the transmission/reception of the VoIP packet is activated, in UL transmission, the UE transmits a uplink VoIP packet to the eNB according to the 1st and 2nd configuration information. In addition, in DL transmission, the eNB transmits a downlink VoIP packet to the UE according to the 1st and 2nd configuration information.

Figure 25:
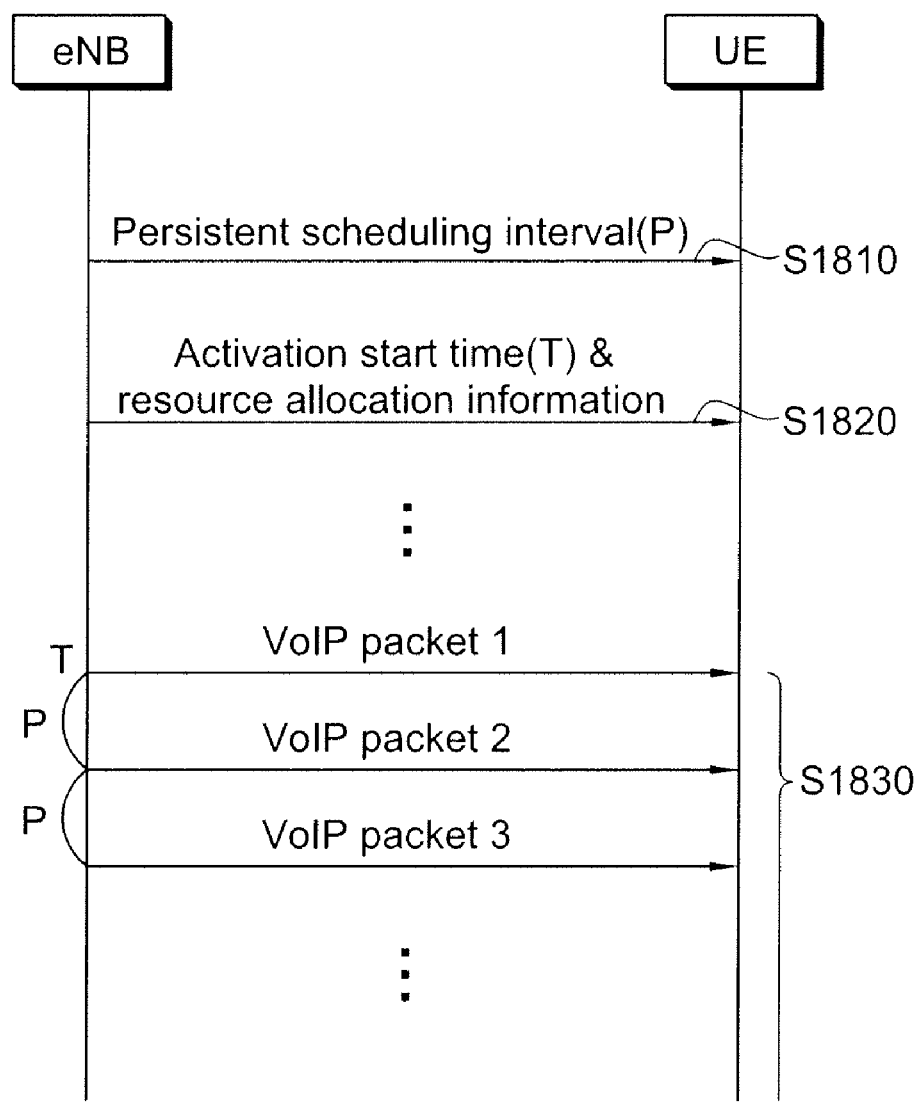
FIG. 25 is a flow diagram showing a method for transmitting a parameter for persistent scheduling according to another embodiment of the present invention.

FIG. 25 is a flow diagram showing a method for transmitting a parameter for persistent scheduling according to another embodiment of the present invention. This method equally applies not only to DL transmission but also to UL transmission.

Referring to FIG. 25, an eNB transmits a persistent scheduling interval P to a LIE (step S1810). The persistent scheduling interval is a message generated by an upper layer. The upper layer may be an RRC layer. The eNB transmits an activation start time T and resource allocation information to the UE (step S1820). The activation start time T is a time at which a VoIP packet is actually transmitted/received by persistent scheduling. The activation start time and the resource allocation information are messages generated by a lower layer. The lower layer may be a MAC layer or a PHY layer. If the activation start time and the resource allocation information are information of the PHY layer, the activation start time and the resource allocation information can be transmitted on a physical downlink control channel.

Downlink VoIP packets 1, 2, 3, . . . are transmitted according to the resource allocation information with the persistent scheduling interval P, starting from the activation start time T (step S1830). The activation start time T may be provided as an absolute time. The activation start time T may be provided as a position of a subframe. The activation start time T may be provided as a unit of indicating other time positions. The persistent scheduling interval, the activation start time, and the resource allocation information may also apply not only to transmission of downlink VoIP packets but also to transmission of uplink VoIP packets.

Figure 26:
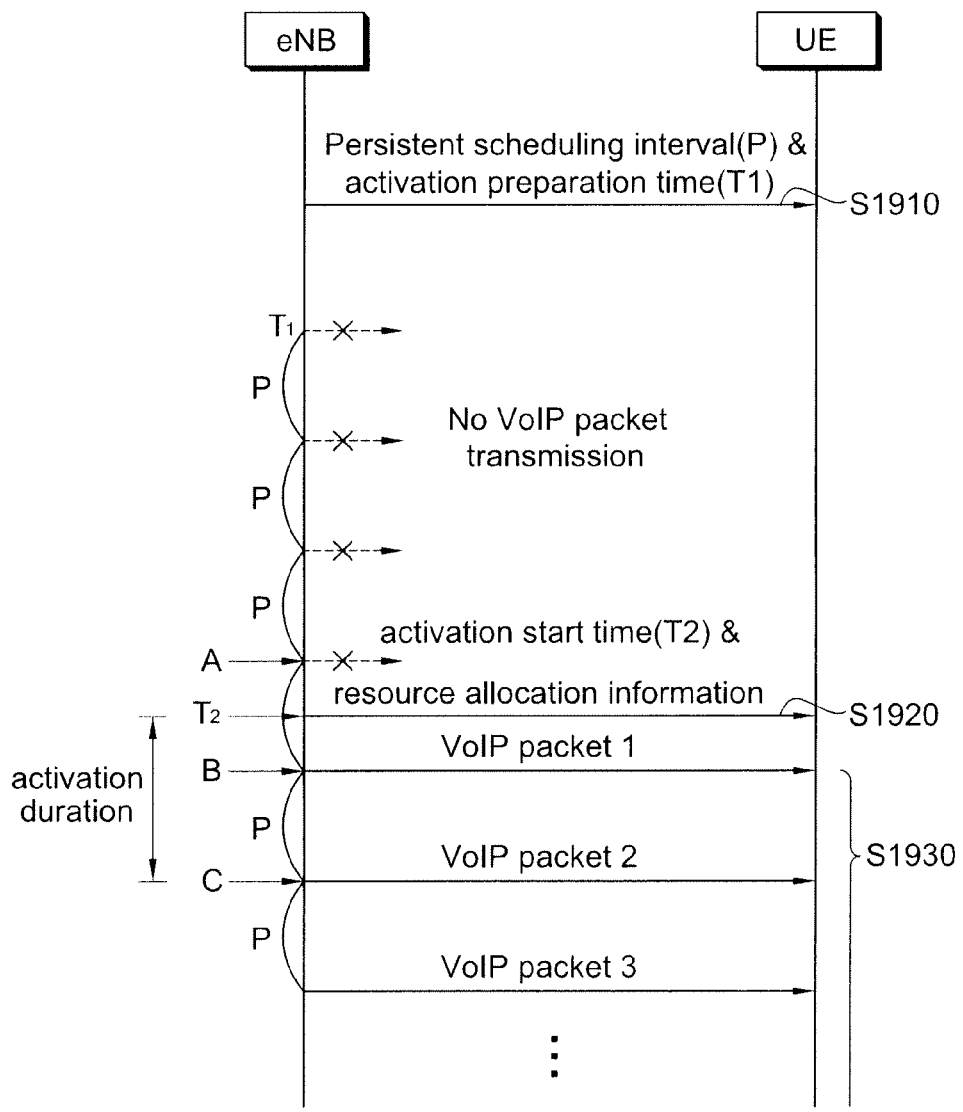
FIG. 26 is a flow diagram showing a method for transmitting a parameter for persistent scheduling according to another embodiment of the present invention.

FIG. 26 is a flow diagram showing a method for transmitting a parameter for persistent scheduling according to another embodiment of the present invention. This method equally applies not only to DL transmission but also to UL transmission.

Referring to FIG. 26, an eNB transmits a persistent scheduling interval P and an activation start time T1 to a UE (step S1910). The persistent scheduling interval and the activation start time are messages generated by an upper layer. The upper layer may be an RRC layer. After transmitting the persistent scheduling interval, the eNB does not transmit a VoIP packet until the activation start time is received. However, starting from the activation start time, the eNB implicitly recognizes the persistent scheduling interval.

After a predetermined time elapses, the eNB transmits an activation start time T2 and resource allocation information to the UE (step S1920). The activation start time is a message generated by a lower layer. The lower layer may be a MAC layer or a PHY layer. If the activation start time and the resource allocation information are information of the PHY layer, the activation start time and the resource allocation information can be transmitted on a physical downlink control channel.

In an exemplary case, the activation start time may not coincide with a transmission time based on the persistent scheduling interval. That is, the activation start time T2 may be positioned between transmission times A and B. However, starting from the activation start time, the eNB implicitly recognizes the persistent scheduling interval. Thus, donwlink VoIP packets 1, 2, 3, . . . can be transmitted with the persistent scheduling interval (step S1930). In this case, transmission starts from the transmission time B immediately after the activation start time T2.

In another exemplary case, transmission of downlink VoIP packets may start from a transmission time C separated from the activation start time. A time difference between the activation start time T2 and the transmission time C may be referred to as an activation duration. The activation duration may be information which is known in advance between the UE and the eNB or may be control information which is additionally reported by the eNB to the UE.

(6) A Method for Performing HARQ in a VoIP Service

Hybrid automatic repeat request (HARQ) is a technique in which the conventional ARQ scheme is combined with channel coding of a PHY layer in order to improve transmission efficiency in data processing. The HARQ is performed by at least one HARQ entity existing in a UE or an eNB. The HARQ entity enables seamless data transmission while waiting for a feedback (i.e., an ACK signal or a NACK signal) for indicating successful/unsuccessful reception of data immediately previously transmitted. In UL transmission, the UE receives resource assignment from the eNB and reports associated HARQ information to the HARQ entity. Then, the HARQ entity performs a HARQ process indicated by the HARQ information. To support the HARQ entity, the UE can use a plurality of parallel HARQ processes.

The scheduling information may include a HARQ channel identification (ID) that is information regarding a channel for transmitting HARQ data. The HARQ channel ID may be referred to as a HARQ process number. In particular, in asynchronous HARQ such as DL transmission, there is no guarantee that HARQ is periodically performed. Thus, the UE first confirms the HARQ process number assigned to the UE itself and thereafter performs the HARQ. Therefore, the eNB has to report the HARQ process number in advance to the UE. In this case, the HARQ process number may be transmitted using signaling of a PHY layer or may be transmitted using signaling of an upper layer of the PHY layer.

In the VoIP service, a user acceptance level is high (i.e., 100 users/1 MHz), and a packet size is significantly small (i.e., 400 bits). Thus, a large overhead is generated whenever control signals are transmitted. Accordingly, a scheduling scheme for reducing the overhead of the control signals is used according to a communication system. Persistent scheduling (or semi-persistent scheduling) can reduce the overhead of the control signals by minimizing the number of transmission of the control signals. That is, parameters (e.g., a VoIP packet transmission time, a modulation and coding scheme (MCS), resource block (RB) allocation information, etc.) are initially configured and are not changed thereafter. Hereinafter, the terminology 'persistent scheduling' refers to not only normal persistent scheduling but also semi-persistent scheduling.

If a HARQ process for VoIP packet transmission is differently mapped for every respective scheduling, there may be a problem in which the HARQ process overlaps with a HARQ process of different data retransmission by dynamic scheduling. As another problem, a time at which a previous VoIP packet is retransmitted by the HARQ process may coincide with a time at which a new VoIP packet is transmitted by the same HARQ process, when a new VoIP packet has to be transmitted in every transmission time. In this case, either the new VoIP packet or the previous VoIP packet may be lost. Therefore, a method for operating the HARQ process in the VoIP service applied with persistent scheduling needs to be definitely defined.

Figure 27:
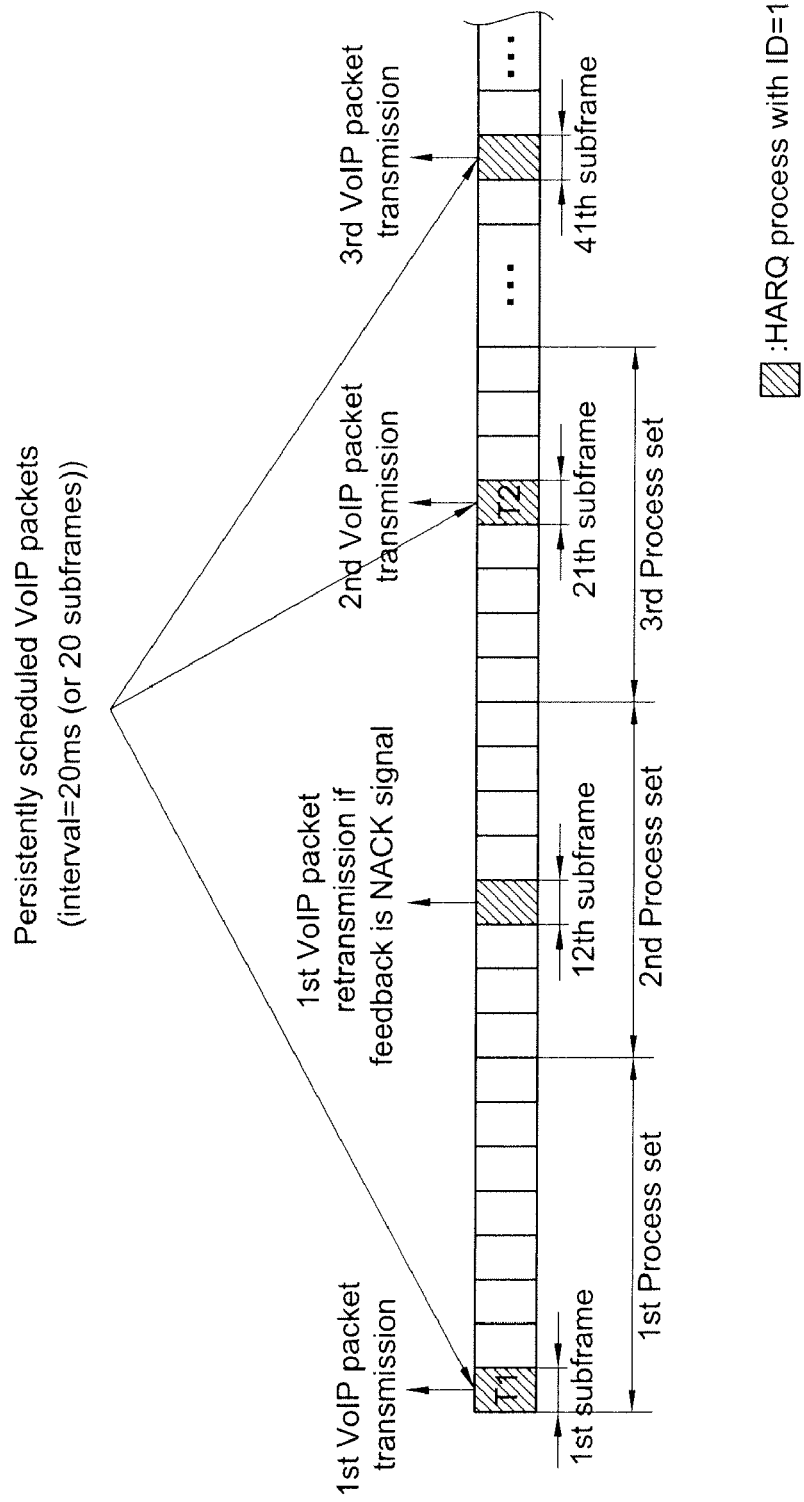
FIG. 27 shows a method for performing hybrid automatic repeat request (HARQ) in a VoIP service according to an embodiment of the present invention.

FIG. 27 shows a method for performing HARQ in a VoIP service according to an embodiment of the present invention. This is an example in which data applied with persistent scheduling is transmitted using asynchronous HARQ. This method can apply both to DL transmission and UL transmission.

Referring to FIG. 27, starting from a 1st subframe, persistently scheduled VoIP packets are transmitted/received with an interval of 20 ms. That is, the VoIP packets are transmitted/received in a 1st subframe, a 21st subframe, a 41th subframe, etc. 20 subframes are a persistent scheduling interval. When HARQ processes with 8 channels are used, 8 different HARQ processes are respectively mapped onto contiguous 8 subframes. That is, HARQ processes with IDs 1 to 8 can be independently and exclusively mapped onto 1st to 8th subframes. N HARQ processes mapped onto N contiguous subframes are defined as a process set.

Since the number of HARQ processes is 8, a mapping relation between the HARQ processes and the subframes (or channels) are repeated in every 8 subframes. An order of mapping the HARQ processes onto the subframes may be equal in each process set or may be different from one process set to another. For example, for a 1st process set mapped onto first 8 subframes, a HARQ process with an ID of 1 is mapped onto a 1st subframe. On the other hand, for a 2nd process set mapped onto next 8 subframes, a HARQ process with an ID of 1 can be mapped onto a 12th subframe rather than a 9th subframe. The number of HARQ processes may be less than (or greater than) 8 according to a system. Since the 1st subframe is used in transmission of the 1st VoIP packet, the 2nd to 8th subframes can be used by a HARQ process with another ID when VoIP packets are transmitted to another receiver or when non-voice data is transmitted.

Now, transmission or retransmission of a VoIP packet by a HARQ process between transmission times T1 and T2 according to persistent scheduling will be described. At least one HARQ process manages transmission and retransmission of a 1st VoIP packet. In FIG. 27, a HARQ process with an ID of 1 manages transmission and retransmission of the 1st VoIP packet. A receiver feeds back an ACK signal to a transmitter when the 1st VoIP packet is successfully decoded. The receiver feeds back a NACK signal to the transmitter when the 1st VoIP is unsuccessfully decoded. A method for operating the HARQ process will be described with respect to the both cases.

(A) When a Receiver Feeds Back an ACK Signal

When the receiver feeds back the ACK signal for the 1st VoIP packet between T1 and T2, the transmitter can assign the HARQ process with an ID of 1 to another service (i.e., transmission of another VoIP packet or transmission of non-voice data) of the receiver. In this case, the receiver and the transmitter flush the 1st VoIP packet stored in the HARQ buffer. The transmitter transmits a 2nd VoIP packet to the receiver at T2.

(B) When a Receiver Feeds Back a NACK Signal

When the receiver cannot successfully receive the 1st VoIP packet until T2, the receiver transmits the NACK signal to the transmitter, and keeps the packet in the HARQ buffer instead of flushing the HARQ buffer. Retransmission of the 1st VoIP packet can be performed only before T2. After T2, the 1st VoIP packet is no longer retransmitted. That is, when the receiver persistently feeds back the NACK signal for the 1st VoIP packet until T2, the transmitter does not retransmit the VoIP packet any more but transmits a 2nd VoIP packet at T2.

Accordingly, at T2, the receiver operates in a mode for receiving the new VoIP packet (i.e., the 2nd VoIP packet). In this case, if the HARQ buffer is not empty, information stored in the HARQ buffer is replaced with the 2nd VoIP packet received at T2. If the 1st VoIP packet is not successfully received even when it is retransmitted at a 2nd process set (i.e., last retransmission before T2), the receiver may flush the HARQ buffer before T2, starting from a retransmission time (i.e., a 12th subframe) of the 2nd process set. Then, the receiver may store the 2nd VoIP packet in the HARQ buffer.

In this case, MAC HARQ entities of the transmitter and the receiver can trigger ARQ retransmission by reporting unsuccessful transmission to an RLC layer which is an upper layer of a MAC layer. Of course, triggering of the ARQ retransmission may be available only in an ARQ operating mode (e.g., an AM RLC). Further, a maximum number of HARQ retransmission, which is information required to flush the HARQ buffer, can be transmitted using signaling of the upper layer.

Irrespective of whether the receiver feeds back the ACK signal or the NACK signal, the transmitter transmits a new 2nd VoIP packet at T2 (i.e., a new persistent scheduling transmission time). Transmission of the 2nd VoIP packet may be managed by a HARQ process with an ID of 1 or a HARQ process with another ID. This is because, when a process set changes, an order of an ID of a HARQ process mapped onto a channel (or subframe) may also change.

It has been described above that only the HARQ process with an ID of 1 manages transmission or retransmission of the 1st VoIP packet. However, as described above, the 1st VoIP packet may be managed by one or more HARQ processes. Therefore, the retransmission of the 1st VoIP packet may be managed by not only the HARQ process with an ID 1 but also a plurality of HARQ processes with different IDs. For example, first retransmission of the 1st VoIP packet may be managed by a HARQ process with an ID of 2, and second retransmission of the 1st VoIP packet may be managed by a HARQ process with an ID of 3. In both cases, further retransmission is terminated at a new persistent scheduling transmission time and then a new VoIP packet is transmitted.

Figure 28:
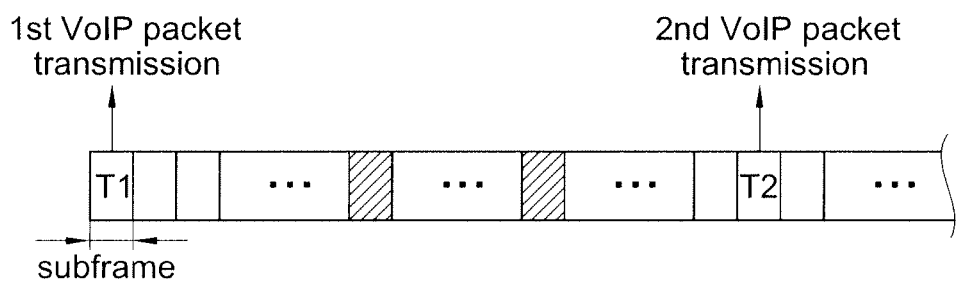
FIG. 28 shows a method for performing HARQ in a VoIP service according to another embodiment of the present invention.

FIG. 28 shows a method for performing HARQ in a VoIP service according to another embodiment of the present invention. This is an example in which data applied with persistent scheduling is transmitted using synchronous HARQ. This method can apply both to DL transmission and UL transmission.

Referring to FIG. 28, unlike the case of FIG. 27, an additional HARQ process is not managed since the transmission of an ACK/NACK signal is synchronized. However, a method for synchronizing a retransmission time between a transmitter and a receiver may be problematic. Hereinafter, a 1st transmission time T1 is defined as a time at which a 1st VoIP packet is transmitted, and a 2nd transmission time T2 is defined as a time at which a 2nd VoIP packet is transmitted. First, a case where the receiver feeds back a NACK signal will be described. The transmitter transmits the 1st VoIP packet at the 1st transmission time T1 based on persistent scheduling, and thereafter retransmits the VoIP packet at least once throughout at least one predetermined particular subframe. A retransmission time is implicitly determined between the transmitter and the receiver. While performing such a process, further retransmission of the 1st VoIP packet is terminated at the 2nd transmission time T2 based on persistent scheduling, and then the 2nd VoIP packet is transmitted. The transmission times T1 and T2 may also be referred to as semi persistent scheduling (SPS) timing.

On the other hand, if the receiver feeds back an ACK signal, the transmitter transmits the 2nd VoIP packet at the 2nd transmission time T2. In this case, the 1st VoIP packet stored in a HARQ buffer for retransmission is flushed from the HARQ buffer.

According to the synchronous HARQ described above, retransmission of data applied with dynamic scheduling can be completed faster than a predetermined time. Further, whether the data is to be retransmitted or not is reported to an upper layer of the transmitter and the receiver so that lost data can be recovered with ARQ retransmission. Furthermore, information regarding a maximum number of HARQ retransmission is shared between the transmitter and the receiver through signaling of the upper layer. Thus, the maximum number of HARQ retransmission can be smaller than a typical maximum number of HARQ retransmission.

Hereinafter, a method for activating or modifying persistent scheduling by using persistent scheduling information (or simply, an SPS activation or modification method), a method for instructing retransmission in persistent scheduling, and a method for releasing persistent scheduling will be described.

First, in order to activate or modify persistent scheduling, an eNB can transmit normal dynamic DL scheduling information or dynamic UL scheduling information. The dynamic scheduling information includes at least one of a new data indicator (NDI) and a redundancy version (RV). The NDI indicates whether persistent scheduling is for transmission of new data. The RV indicates a retransmission version. For example, if the NDI is 1-bit information and the RV is 2-bit information, new data transmission may be indicated when NDI=1, and retransmission may be indicated when NDI=0. The opposite is also possible. Meanwhile, when new transmission is made, the RV may be 00. When retransmission is made, the RV may be any one of selected from {01, 10, 11}. In both cases, if the dynamic scheduling information is for transmission of new data, persistent scheduling is activated or modified.

Next, in order to instruct retransmission in persistent scheduling, the eNB may transmit normal dynamic scheduling information. In addition to a general ID of the UE, the eNB can perform masking on the dynamic scheduling information with a persistent C-RNTI which is an identifier assigned to a specific UE for persistent scheduling. By demasking, the UE can know that the dynamic scheduling information is used for persistent scheduling. Of course, when one HARQ process is dedicatedly assigned to the specific UE for persistent scheduling, the eNB may perform transmission by masking a general C-RNTI with the dynamic scheduling information. The dynamic scheduling information includes an NDI, an RV, etc., which are information for indicating retransmission. Herein, the C-RNTI is an ID for a UE, and may be replaced with another terminology (e.g., a station-ID).

Finally, in order to release persistent scheduling, the followings may be used. Herein, scheduling information includes at least two of an NDI, an RV, and an MCS.

In an exemplary case, if information elements indicating retransmission or new transmission of data do not coincide with one another, it indicates release of persistent scheduling. For example, if the NDI indicates retransmission and the RV indicates new data transmission, these information elements do not coincide (or coexist) with each other. In another exemplary case, when the eNB or the UE may transmit a MAC message indicating release of persistent scheduling, release of persistent scheduling can be reported.

Persistent scheduling may also apply to a time division duplexing (TDD) system. In the TDD system, downlink and uplink are distinguished for each subframe. Thus, configuration of a persistent scheduling interval is important. According to a configuration of a radio frame, whether each subframe within the radio frame is assigned for uplink or downlink is determined. The configuration of the radio frame indicates a specific rule by which all subframes within one radio frame are assigned (or reserved) for uplink or downlink. Table 5 shows an example of the configuration of the radio frame.

TABLE 5

| Config- | Switch-point | Subframe number | | | | | | | | | |
|---|---|---|---|---|---|---|---|---|---|---|---|
| uration | periodicity | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

In Table 5, 'D' denotes a subframe used for DL transmission, and 'U' denotes a subframe used for UL transmission. Further, 'S' denotes a special subframe that is used for a special purpose, such as, frame synchronization or DL transmission. Hereinafter, a subframe used for DL transmission is simply referred to as a downlink subframe, and a subframe used for UL transmission is simply referred to as an uplink subframe. For each configuration, a position and the number of downlink and uplink subframes are different from each other within one radio frame.

A time point at which downlink is switched to uplink or a time point at which uplink is switched to downlink is defined as a transitioning point. A switch-point periodicity represents a period in which the same transitioning pattern is repeated between uplink and downlink. The switch-pint periodicity is 5 ms or 10 ms. For example, in case of the configuration 0, transitioning occurs in the pattern of D→S→U→U→U from 0th to 4th subframes. In addition, from 5th to 9th subframes, transitioning occurs in the pattern of D→S→U→U→U which is the same pattern as the previous transitioning. Since one subframe is 1 ms, the switch-point periodicity is 5 ms. That is, the switch-point periodicity is less than one radio frame length (i.e., 10 ms), and transitioning is repeated one time within the radio frame.

In both cases, the configuration of the radio frame is repeated in a unit corresponding to a length (i.e., 10 ms) of the radio frame. Thus, the eNB of the TDD system can configure the persistent scheduling interval in a radio frame unit. For example, the persistent scheduling interval may be determined to be one radio frame, two radio frames, three radio frames, etc. The persistent scheduling information can be transmitted using signaling of an upper layer.

(7) Transition Method During Non-Voice Data Transmission.

In uplink VoIP transmission, non-voice data can be transmitted as well as VoIP data during talk period. If a UE makes a transition to silence period from talk period, it is necessary for the UE to notify the transition to a eNB. Because the eNB is supposed to transmit both dynamic scheduling information for the non-voice data and persistent scheduling information for the VoIP packet, the UE can transmit SID using resource assigned either by the dynamic scheduling information or by the persistent scheduling information. Therefore, an appropriate decision should preliminarily be made by the UE about which resource to use to transmit the SID. This decision can also be made by the eNB in downlink VoIP transition from talk period to silence period the same way as in uplink case.

Hereinafter, a transition management method during non-voice data transmission is disclosed.

(A) Uplink Talk Period to Silence Period Transition

Figure 29:
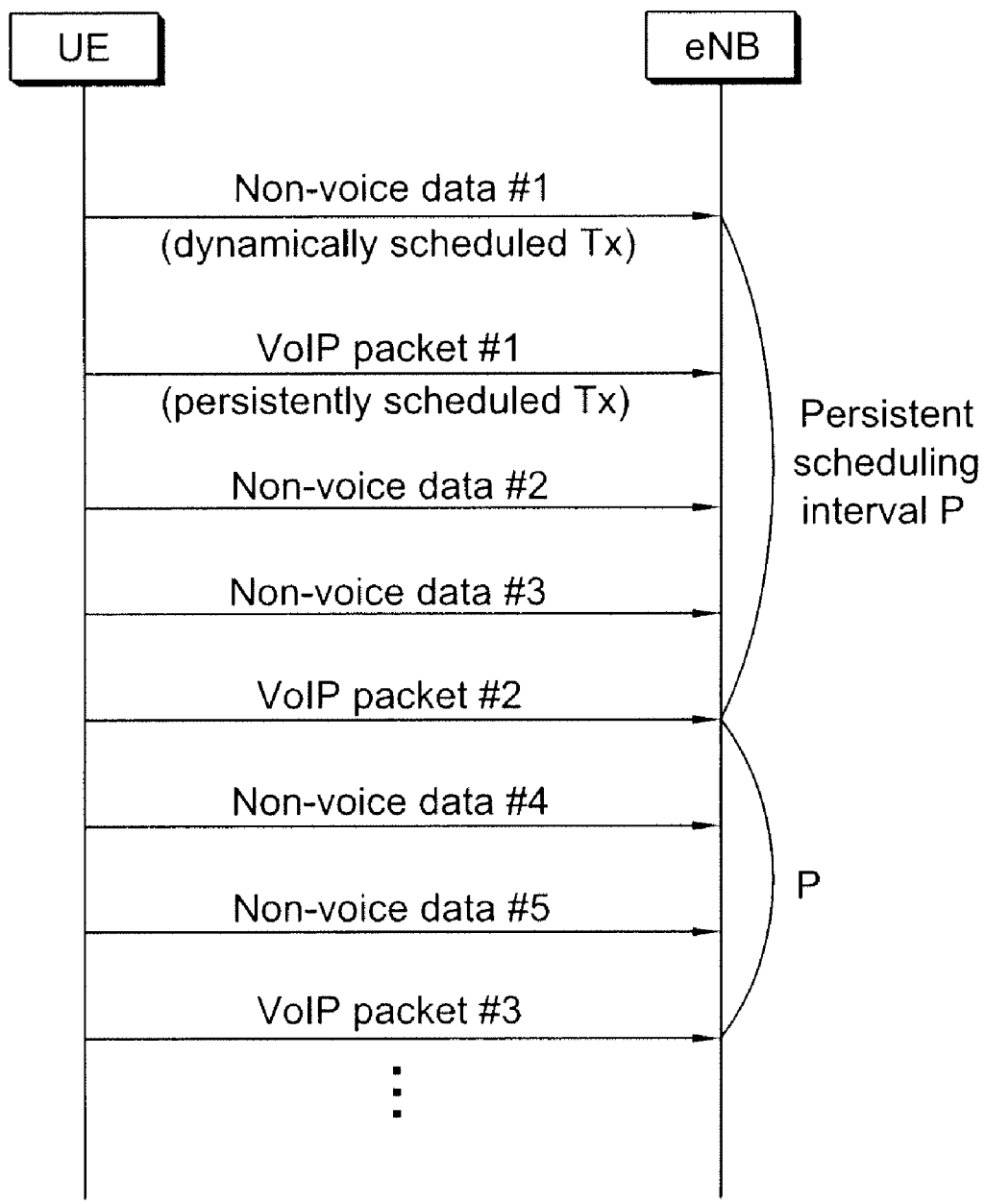
FIG. 29 is an example of uplink VoIP packet transmission during uplink non-voice data transmission.

FIG. 29 is an example of uplink VoIP packet transmission during uplink non-voice data transmission. This figure shows a procedure during talk period.

Referring to FIG. 29, during talk period a UE transmits VoIP packet #1, #2, #3, etc consecutively to an eNB with persistent scheduling interval P according to persistent scheduling information. The UE also transmits non-voice data #1, #2, #3, #, 4, #5, etc an eNB in sequence according to dynamic scheduling information. This pattern of transmission is called VoIP packet transmission during non-voice data transmission or non-voice data transmission during talk period.

Figure 30:
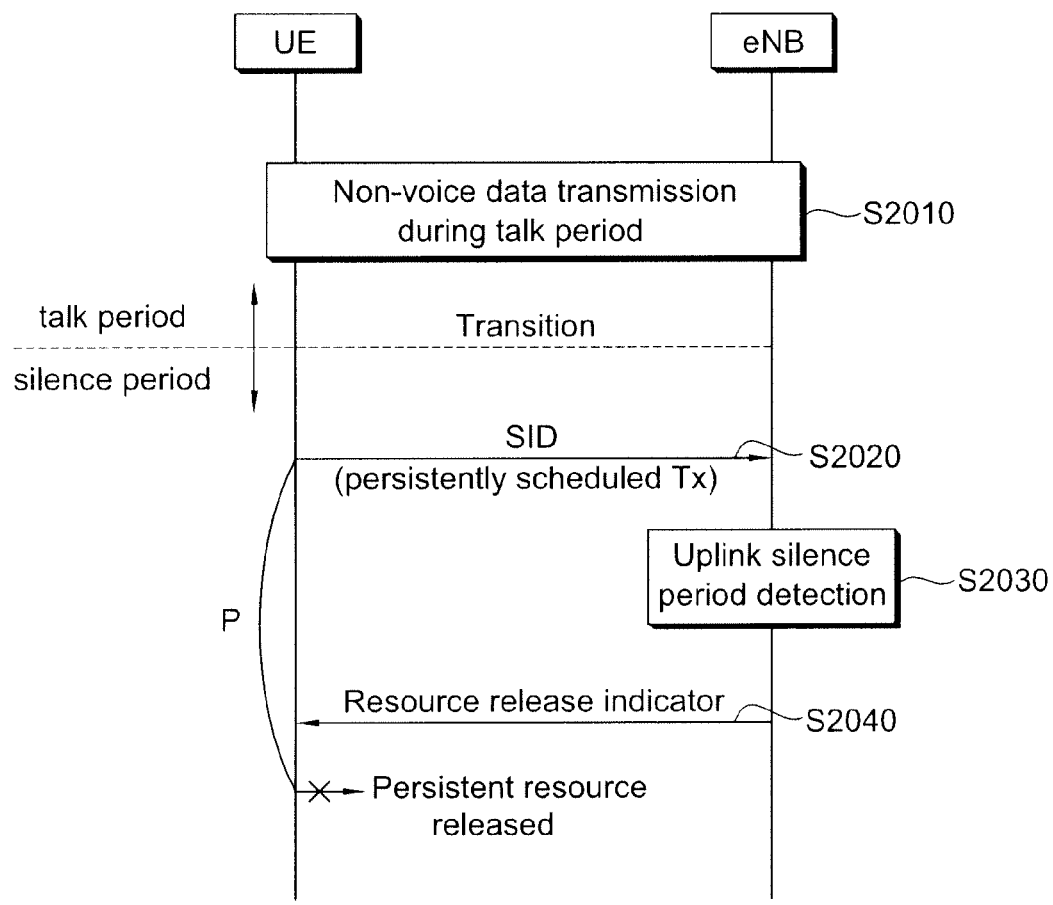
FIG. 30 is a flow diagram of illustrating a transition management method during uplink non-voice data transmission according to an example of the present invention.

FIG. 30 is a flow diagram of illustrating a transition management method during uplink non-voice data transmission according to an example of the present invention.

Referring to FIG. 30, a UE performs uplink non-voice data transmission to an eNB during uplink talk period (step S2010). This step is well explained in FIG. 29 above. When the UE has no more uplink VoIP packet to transmit, the UE enters silence period. Accordingly, the UE transmits SID to the eNB so that the eNB shall release persistent resource allocated for the UE (step S2020). The SID is transmitted by being mapped on the resource which is assigned by persistent scheduling information. The transmission of SID can take place at certain persistent transmission timing after transition to the silence period. For example, the first persistent transmission timing is selected in the silence period. Or it can be the second or the other transmission timing. Besides, SID can be transmitted more than once until the eNB detects that silence period is activated.

The SID may be a MAC or RLC level message for silence indication. The MAC message may be a BSR message. The BSR message is transmitted using MAC signaling. The BSR message may indicate an absence of buffered data (i.e., "buffer status=empty (or 0)") to show that there is no UL VoIP packet to be additionally transmitted. Or the SID may be a RRC layer message.

Receiving the SID from the UE, the eNB detects uplink silence period (step S2030). So the eNB transmits a resource release indicator to the UE wherein the resource release indicator indicates the release of the persistent resource assigned for the UE (step S2040). The resource release indicator may be transmitted on PDCCH as a persistent uplink grant message. Or the resource release indicator may be a MAC, a RLC or a RRC level message. Non-voice data transmission may still take place in the silence period even if not shown in FIG. 30.

Figure 31:
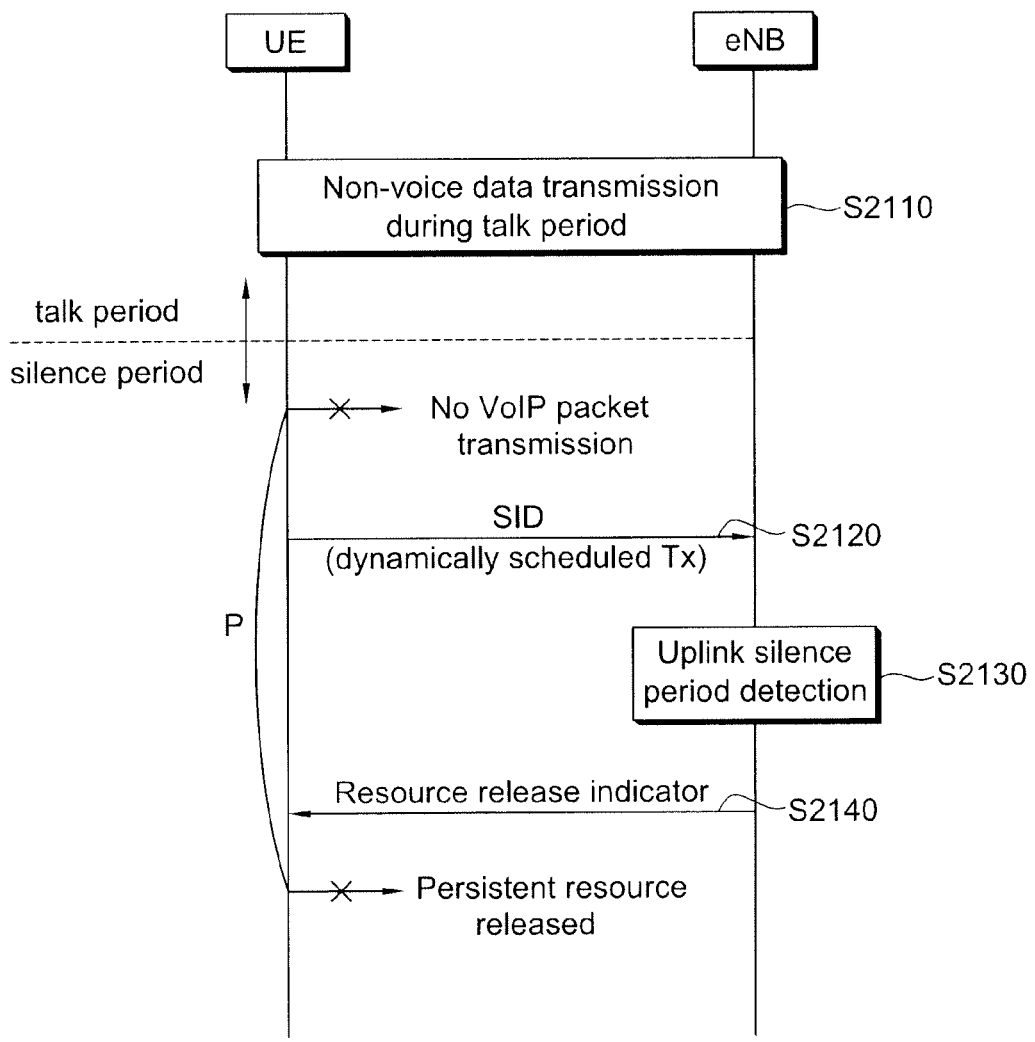
FIG. 31 is a flow diagram of illustrating a transition management method during uplink non-voice data transmission according to another example of the present invention.

FIG. 31 is a flow diagram of illustrating a transition management method during uplink non-voice data transmission according to another example of the present invention.

Referring to FIG. 31, a UE performs uplink non-voice data transmission to an eNB during uplink talk period (step S2110). After entering silence period, the UE doesn't transmit any VoIP packet or a SID in persistent transmission timing in the silence period. Rather, the UE transmits the SID at the transmission timing based on dynamic scheduling in the silence period (step S2120). In other words, the UE transmits the SID using radio resource which is assigned for non-voice data transmission according to dynamic scheduling information. The SID can be transmitted with other non-voice data as well in the manner of multiplexing. The SID may be a MAC or RLC level message for silence indication.

Successfully receiving the SID, the eNB detects the transition to the silence period (step S2130). Then the eNB transmits a resource release indicator to the UE (step S2140). The resource release indicator may be transmitted on PDCCH as a persistent uplink grant message. Or the resource release indicator may be a MAC, a RLC or a RRC level message.

(B) Downlink Talk Period to Silence Period Transition

Figure 32:
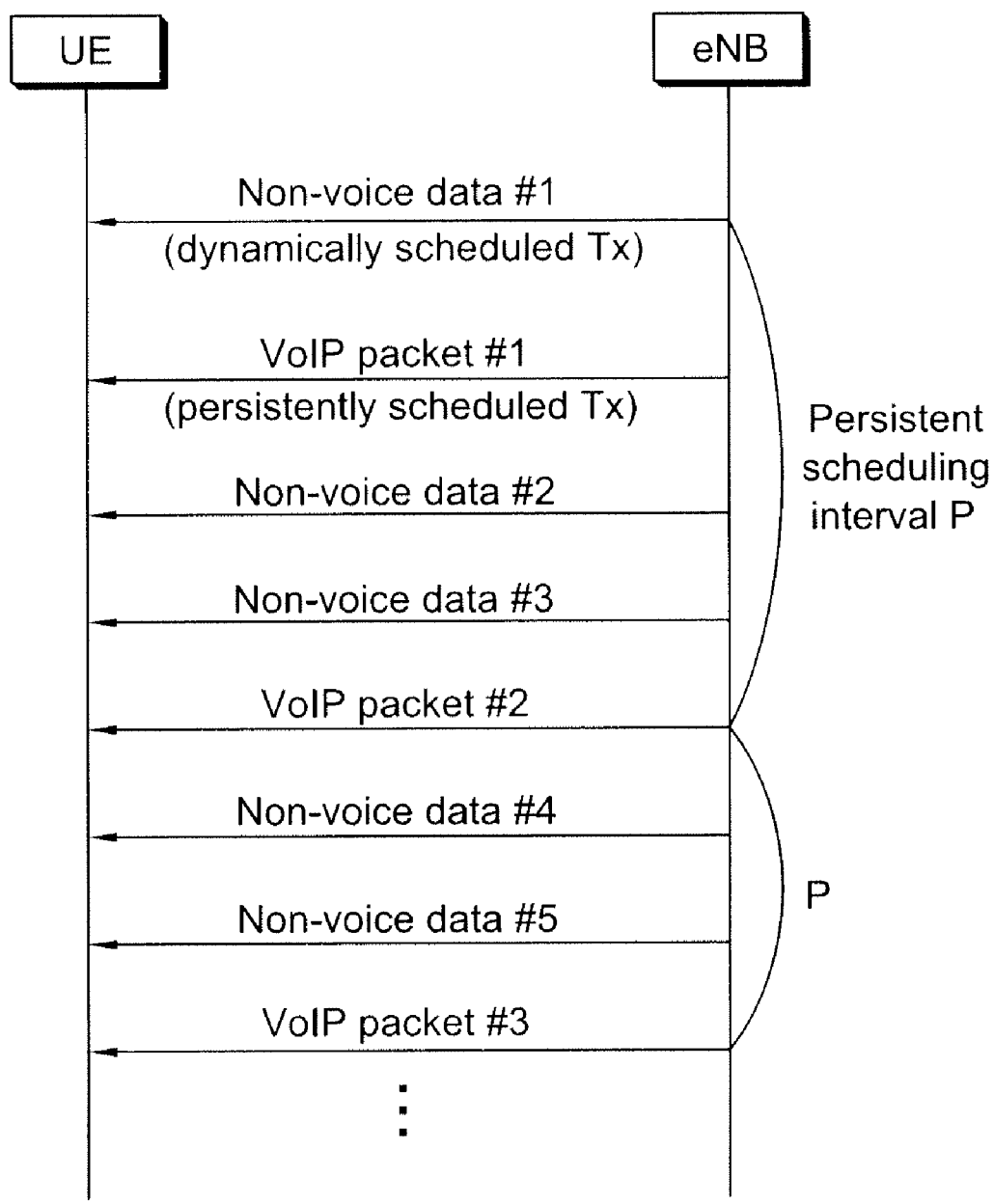
FIG. 32 shows an example of downlink VoIP packet transmission during downlink non-voice data transmission.

FIG. 32 is an example of downlink VoIP packet transmission during downlink non-voice data transmission. This figure shows a procedure during talk period.

Referring to FIG. 32, during talk period an eNB transmits VoIP packet #1, #2, #3, etc. to a UE with persistent scheduling interval P according to persistent scheduling information. The eNB also transmits non-voice data #1, #2, #3, #, 4, #5, etc. to an eNB in sequence according to dynamic scheduling information. This pattern of transmission is called VoIP packet transmission during non-voice data transmission or non-voice data transmission during talk period.

Figure 33:
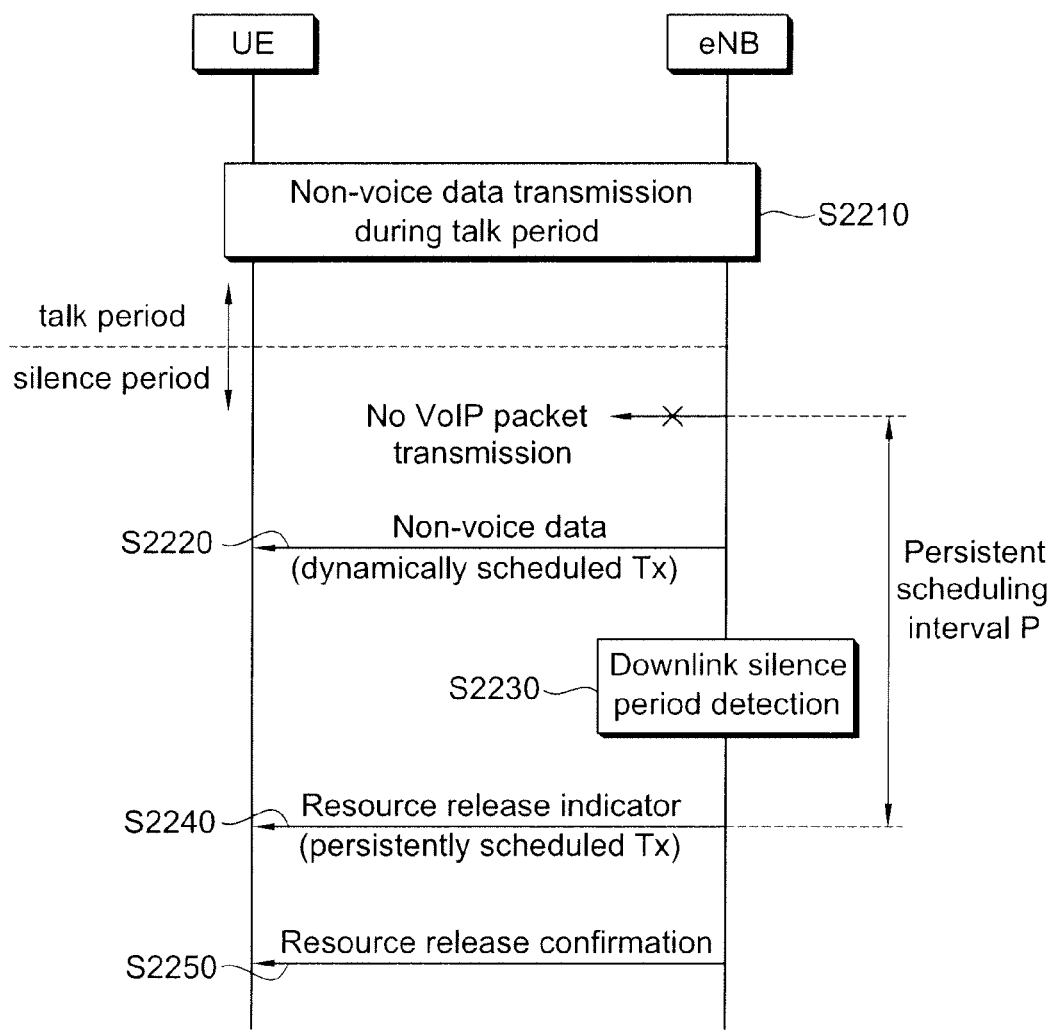
FIG. 33 is a flow diagram of illustrating a transition management method during downlink non-voice data transmission according to an example of the present invention.

FIG. 33 is a flow diagram of illustrating a transition management method during downlink non-voice data transmission according to an example of the present invention.

Referring to FIG. 33, an eNB performs downlink non-voice data transmission to a UE during downlink talk period (step S2210). This step is well explained in FIG. 32 above. When the eNB has no more downlink VoIP packet to transmit, the eNB enters silence period. Accordingly, no VoIP packet transmission takes place at persistent transmission timing in silence period.

Regardless of silence period, the eNB may still transmit non-voice data to the UE according to dynamic scheduling (step S2220). The step S2220 is just an example that non-voce data transmission can take place during silence period. The eNB then may detect downlink silence period when no VoIP packet transmission occurs (step S2230).

The eNB transmits a resource release indicator to the UE by using persistent resource at certain persistent transmission timing (step S2240). The resource release indicator may be transmitted on PDCCH as a persistent downlink grant message. Or the resource release indicator may be a MAC, a RLC or a RRC level message. Non-voice data transmission may still take place in the silence period after the step S2240 even if not shown in FIG. 33. The eNB may transmit a resource release confirmation message to the UE (step S2250). The resource release confirmation message is a notification to the UE that downlink persistent resource is successfully and completely released. The resource release confirmation message may be transmitted on PDCCH. In this case, a persistent downlink grant is used.

Figure 34:
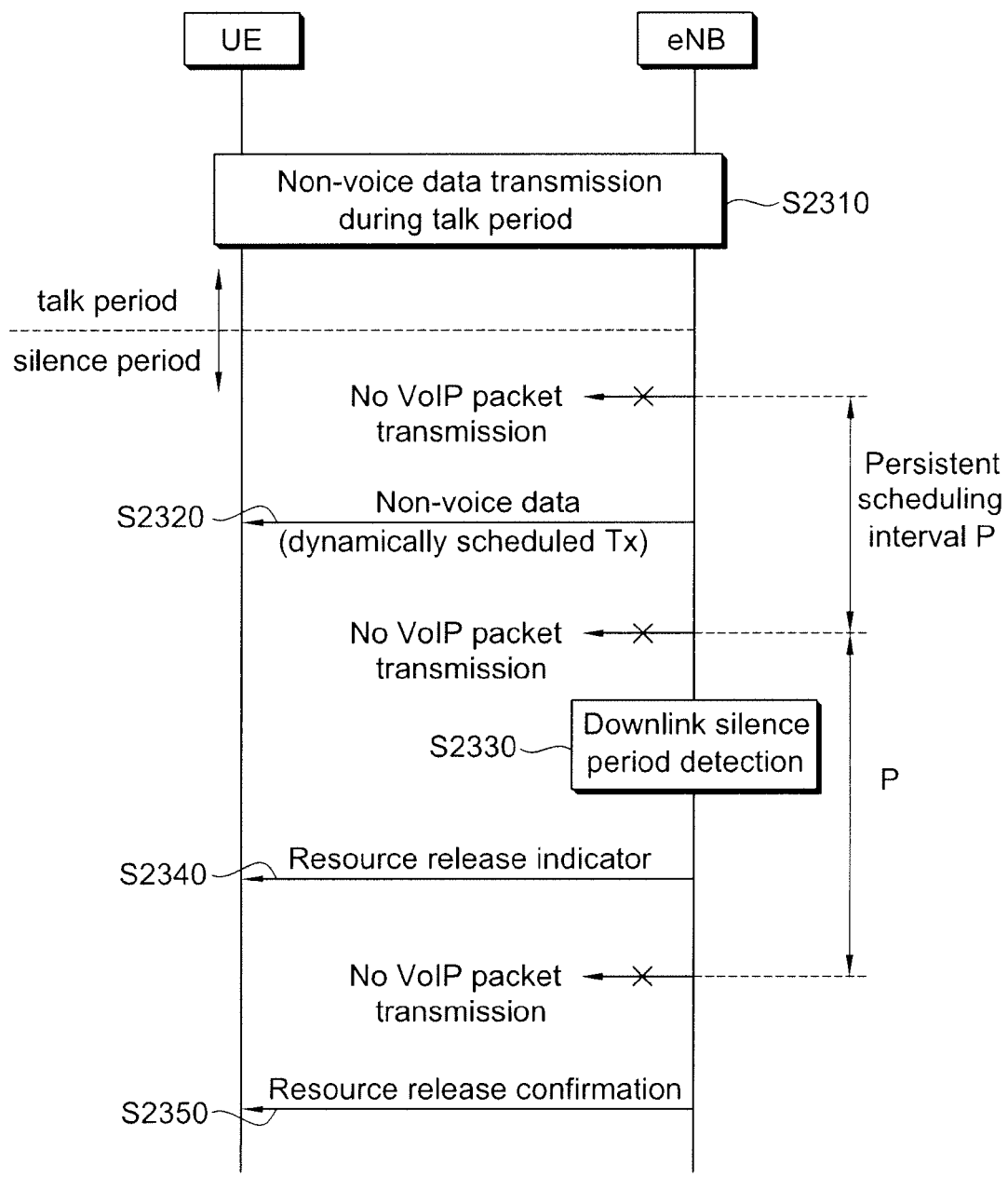
FIG. 34 is a flow diagram of illustrating a transition management method during downlink non-voice data transmission according to another example of the present invention.

FIG. 34 is a flow diagram of illustrating a transition management method during downlink non-voice data transmission according to another example of the present invention.

Referring to FIG. 34, an eNB performs downlink non-voice data transmission to a UE during downlink talk period (step S2310). This step is well explained in FIG. 32 above. The eNB makes transition from talk period to silence period. Regardless of silence period, the eNB may still transmit non-voice data to the UE according to dynamic scheduling (step S2320). The eNB shall not release the persistent resource until it detects the silence period. The eNB then may detect downlink silence period after a couple of persistent transmission timings without VoIP packet transmission (step S2330).

The eNB transmits a resource release indicator to the UE (step S2340). The resource release indicator may be a MAC, a RLC or a RRC level message. Or the resource release indicator is a control message in a new type of format. In an embodiment, the resource release indicator may be transmitted by being multiplexed with non-voice data. In this case, the resource release indicator may be mapped on resource assigned by dynamic scheduling.

In another embodiment, the resource release indicator may be transmitted by being mapped on dynamic resource which is originally assigned for non-voice data transmission without being multiplexed with non-voice data.

In yet another embodiment, the resource release indicator may be transmitted by being mapped on dynamic resource which is assigned for the transmission of the resource release indicator. So the resource release indicator may be transmitted on PDCCH in accordance with a downlink grant.

Non-voice data transmission may still take place in the silence period after the step S2320 even if not shown in FIG. 34. The eNB may transmit a resource release confirmation message to the UE (step S2350). The resource release confirmation message may be transmitted on PDCCH. In this case, a persistent downlink grant is used.

(C) Uplink Silence Period to Talk Period Transition

Figure 35:
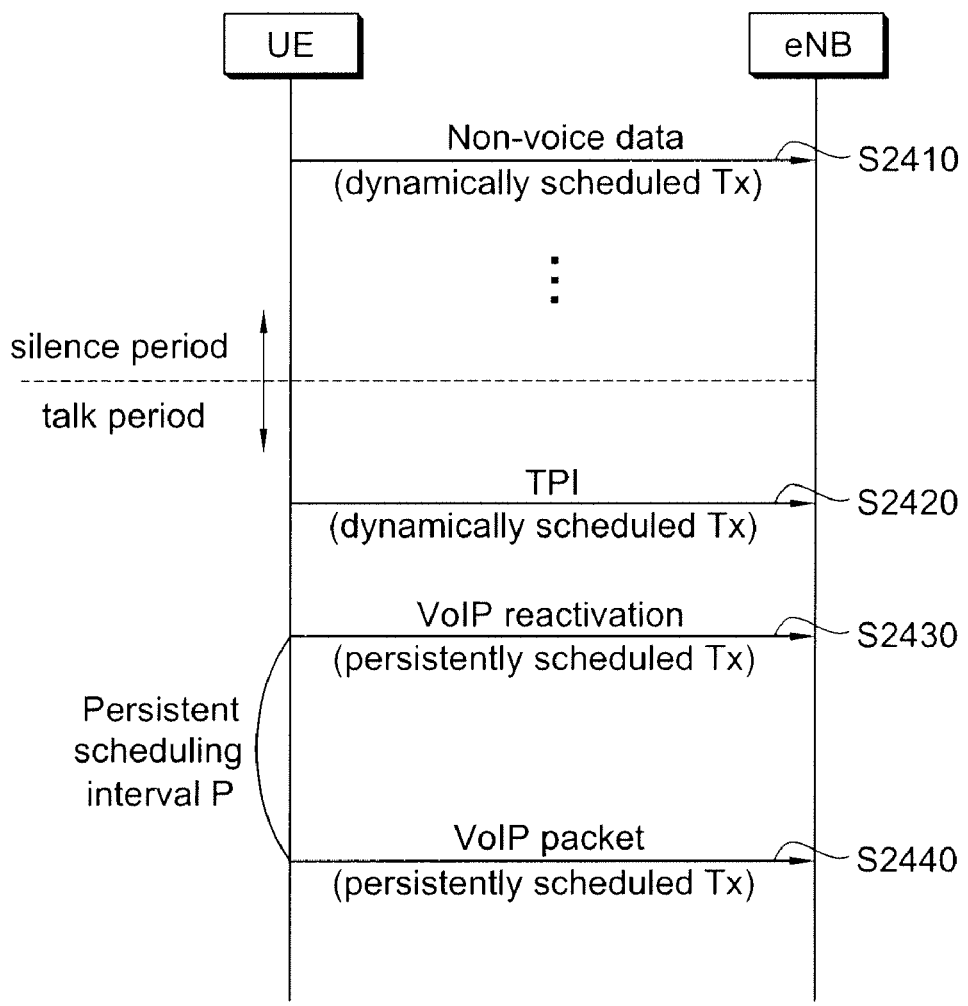
FIG. 35 is a flow diagram of illustrating a transition management method during uplink non-voice data transmission according to yet another example of the present invention.

FIG. 35 is a flow diagram of illustrating a transition management method during uplink non-voice data transmission according to yet another example of the present invention.

Referring to FIG. 35, a UE transmits uplink non-voice data to an eNB according to a dynamic scheduling in silence period (step S2410). When transition from the silence period to talk period takes place, the UE requests the eNB to assign persistent resource for VoIP packet. This procedure is performed by transmitting talk period indicator (TPI) to the eNB (step S2420). The TPI may be transmitted alone or multiplexed with uplink non-voice data. The TPI is mapped on radio resource which is assigned by uplink dynamic scheduling. Because the persistent resource was released during the silence period and there is still uplink non-voice data transmission going on, the UE can make use of the dynamic resource to transmit TPI.

The TPI may have the same message format with the SID. The TPI and the SID may be distinguished by an indication field in the message format. The TPI may be a MAC, a RLC or a RRC level message. The MAC message may be a BSR message. The BSR message is transmitted using MAC signaling.

After transmitting the TPI, the UE transmits a VoIP reactivation message to the eNB by using persistently scheduled resource (or persistent resource) (step S2430). In an embodiment, the persistently scheduled resource may be what is allocated before the transition by previous persistent scheduling. Then the UE can transmit the VoIP reactivation message implicitly by reusing the previous persistent resource which means no other signaling procedure such as persistent uplink grant transmission by the eNB is needed. This is called an implicit transmission of the VoIP reactivation message.

In another embodiment, the persistently scheduled resource may be newly allocated resource by the eNB for transmission of the VoIP reactivation message. Therefore the UE shall receive new persistent uplink scheduling information on PDCCH before transmitting the VoIP reactivation message. This is called an explicit transmission of the VoIP reactivation message.

The VoIP reactivation message may be a MAC, a RLC or a RRC level message. After transmitting the VoIP reactivation message, the UE transmits a VoIP packet to the eNB by using the persistently scheduled resource after a persistent scheduling interval (step S2440).

(D) Downlink Silence Period to Talk Period Transition

Figure 36:
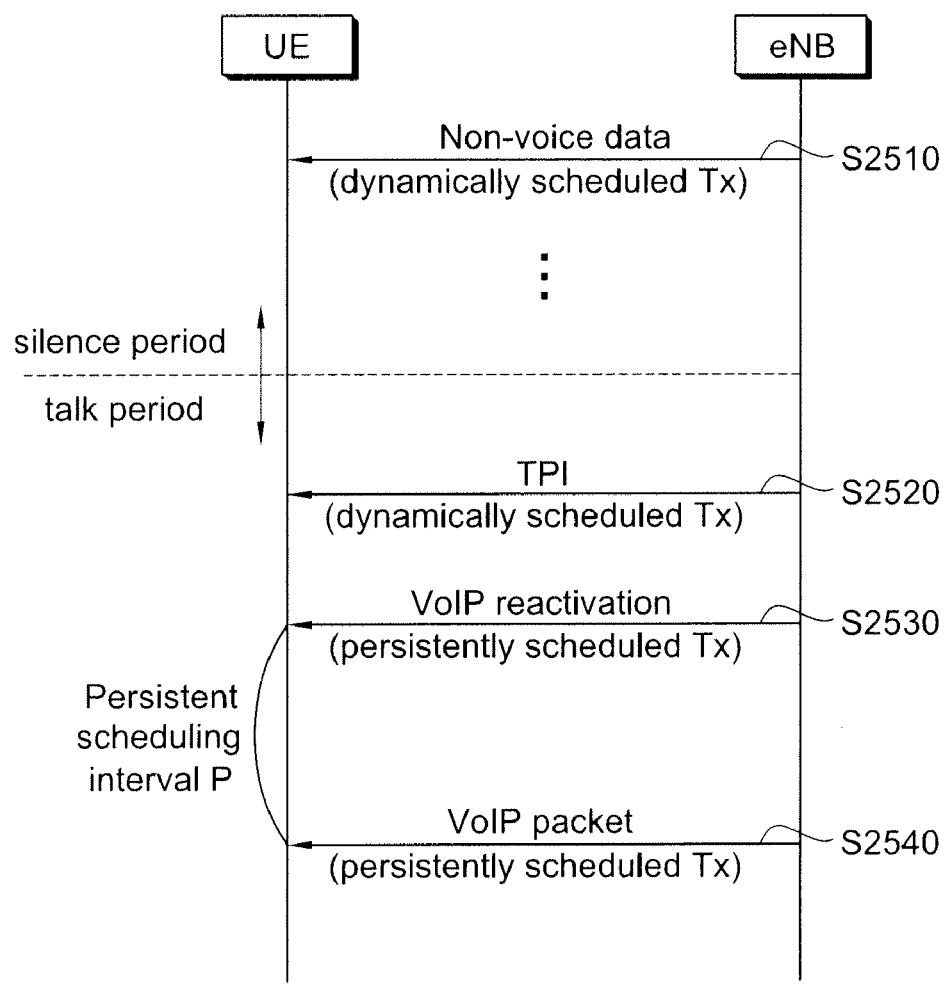
FIG. 36 is a flow diagram of illustrating a transition management method during downlink non-voice data transmission according to yet another example of the present invention.

FIG. 36 is a flow diagram of illustrating a transition management method during downlink non-voice data transmission according to yet another example of the present invention.

Referring to FIG. 36, an eNB transmits downlink non-voice data to a UE according to a dynamic scheduling in silence period (step S2510). When transition from the silence period to talk period takes place, the eNB transmits TPI to notify the UE of the transition (step S2520). The TPI may be transmitted alone or multiplexed with downlink non-voice data. The TPI is mapped on radio resource which is assigned by downlink dynamic scheduling. Because the persistent resource was released during the silence period and there is still downlink non-voice data transmission going on, the eNB can make use of the dynamic resource to transmit TPI.

After transmitting the TPI, the eNB transmits a VoIP reactivation message to the UE by using persistently scheduled resource (step S2530). In an embodiment, the persistently scheduled resource may be what is allocated by previous persistent scheduling. Then the eNB can transmit the VoIP reactivation message implicitly by reusing the previous persistent resource which means no other signaling procedure such as persistent downlink grant transmission is needed. This is called an implicit transmission of the VoIP reactivation message.

In another embodiment, the persistently scheduled resource may be newly allocated resource by the eNB for transmission of the VoIP reactivation message. Therefore the eNB shall transmit new persistent downlink scheduling information on PDCCH first, and then transmits the VoIP reactivation message according to the new persistent downlink scheduling information. This is called an explicit transmission of the VoIP reactivation message.

After transmitting the VoIP reactivation message, the eNB transmits a VoIP packet to the UE by using the persistently scheduled resource (step S2540).

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of controlling a scheduling scheme, the method performed by a user equipment (UE) and comprising:
   receiving first scheduling information including a first resource assignment and a first new data indicator (NDI) on a physical downlink control channel (PDCCH) from a base station (BS);
   if the first scheduling information masked with a persistent Cell Radio Network Temporary Identifier (C-RNTI) associated with a semi-persistent scheduling (SPS) includes the first NDI indicating a first value, activating the SPS for a downlink data packet to be delivered to the UE with the first resource assignment;
   receiving second scheduling information including a second resource assignment on the PDCCH from the BS, the second scheduling information being masked with the persistent C-RNTI associated with the SPS; and
   if the second scheduling information includes a second NDI indicating a second value, using the second scheduling information for a retransmission downlink data packet with the second resource assignment.

2. The method of claim 1, wherein each of the first NDI and the second NDI indicates 1-bit information.

3. The method of claim 1, wherein the first scheduling information further includes redundancy version information.

4. The method of claim 1, wherein the first value is 0, and the second value is set to 1.

5. A user equipment (UE) controlling a scheduling scheme comprising:
   a processor configured for:
   receiving first scheduling information including a first resource assignment and a first new data indicator (NDI) on a physical downlink control channel (PDCCH) from a base station (BS);
   if the first scheduling information masked with a persistent Cell Radio Network Temporary Identifier (C-RNTI) associated with a semi-persistent scheduling (SPS) includes the first NDI indicating a first value, activating the SPS for a downlink data packet to be delivered to the UE with the first resource assignment;
   receiving second scheduling information including a second resource assignment on the PDCCH from the BS, the second scheduling information being masked with the persistent C-RNTI associated with the SPS; and
   if the second scheduling information includes a second NDI indicating a second value, using the second scheduling information for a retransmission downlink data packet with the second resource assignment.

6. The user equipment of claim 5, wherein each of the first NDI and the second NDI indicates 1-bit information.

7. The user equipment of claim 5, wherein the first scheduling information further includes redundancy version (RV) information.

8. The user equipment of claim 5, wherein the first value is 0, and the second value is 1.

* * * * *